United States Patent
Russ et al.

(10) Patent No.: US 11,436,894 B2
(45) Date of Patent: Sep. 6, 2022

(54) ENABLING GAMING FEATURES WITH A TAG HAVING CONDUCTIVE, CODED INK

(71) Applicant: IGT, Las Vegas, NV (US)

(72) Inventors: Michael Russ, Graz (AT); Daniel Landry, Moncton (CA); David Froy, Lakeville-Westmorland (CA); Fayez Idris, Dieppe (CA); Sven Aurich, Schwanberg (AT); Stefan Keilwert, St. Josef (AT); Susanne Kiss, Oberwart (AT)

(73) Assignee: IGT, Las Vegas, NV (US)

( * ) Notice: Subject to any disclaimer, the term of this patent is extended or adjusted under 35 U.S.C. 154(b) by 194 days.

(21) Appl. No.: 16/579,444

(22) Filed: Sep. 23, 2019

(65) Prior Publication Data
US 2021/0090394 A1 Mar. 25, 2021

(51) Int. Cl.
*G07F 17/32* (2006.01)
*G06F 3/01* (2006.01)

(52) U.S. Cl.
CPC .......... *G07F 17/3255* (2013.01); *G06F 3/017* (2013.01); *G07F 17/326* (2013.01); *G07F 17/3209* (2013.01)

(58) Field of Classification Search
CPC ............ G07F 17/3251; G07F 17/3255; G07F 17/326; G07F 17/3209; G06F 3/017
See application file for complete search history.

(56) References Cited

U.S. PATENT DOCUMENTS

| | | | |
|---|---|---|---|
| 6,068,552 A * | 5/2000 | Walker | G07F 17/323 273/139 |
| 8,147,334 B2 | 4/2012 | Gatto et al. | |
| 8,638,939 B1 * | 1/2014 | Casey | G06F 21/36 380/277 |
| 8,764,566 B2 | 7/2014 | Miltenberger et al. | |
| 2012/0306813 A1 * | 12/2012 | Foerster | G06F 3/044 345/174 |

(Continued)

OTHER PUBLICATIONS

"Printed Smart Devices," Prismade Labs GmbH, 2018, 11 pages [retrieved online from: www.prismade.com].

(Continued)

*Primary Examiner* — James S. McClellan
*Assistant Examiner* — Ross A Williams
(74) *Attorney, Agent, or Firm* — Sheridan Ross P.C.

(57) ABSTRACT

The present disclosure relates generally to systems, methods, and devices that enable interactions between a tag having conductive, coded ink and a gaming environment. As an example, a method is disclosed that includes providing a tag with an encoded physical medium that is readable by a touch-capable user interface, determining that the tag has been read by a touch-capable user interface of a gaming device in combination with detecting a gesture of the user at the touch-capable user interface of the gaming device, enabling the gaming device to provide a predetermined game feature in response to determining that the tag has been read by the touch-capable user interface of the gaming device in combination with detecting the gesture of the user at the touch-capable user interface of the gaming device, and updating an electronic record associated with the tag to indicate that the predetermined game feature has been enabled.

20 Claims, 23 Drawing Sheets

(56) References Cited

U.S. PATENT DOCUMENTS

| | | | |
|---|---|---|---|
| 2013/0239058 A1* | 9/2013 | Yao | G06F 3/04847 |
| | | | 715/833 |
| 2014/0342809 A1* | 11/2014 | Milligan | G07F 17/3209 |
| | | | 463/25 |
| 2015/0170465 A1* | 6/2015 | Johnson | G07F 17/3227 |
| | | | 463/25 |
| 2019/0096181 A1 | 3/2019 | Lyons et al. | |
| 2020/0201531 A1* | 6/2020 | Leung | G06F 3/0416 |

OTHER PUBLICATIONS

Official Action for U.S. Appl. No. 16/579,371, dated Jun. 4, 2021 11 pages.

Official Action for U.S. Appl. No. 16/579,371, dated Jan. 6, 2022 14 pages.

\* cited by examiner

ENABLING GAMING FEATURES WITH A TAG HAVING CONDUCTIVE, CODED INK

BACKGROUND

The present disclosure is generally directed to gaming environments and, in particular, toward the use of tags having conductive, coded ink in a gaming environment.

Humans interact with computers and computing devices in many ways. It is often the interface presented by the computing device that defines or constrains the way in which a human is allowed to interact with the computing device. Computing devices used in gaming environments, often referred to as gaming devices, Electronic Gaming Machines (EGMs), or the like, tend to have a specific interface that requires the user to interact with the device in a particular way. In a casino where revenue is driven by humans playing games (e.g., interacting with gaming devices), it is important to make the interface of the gaming device attractive and easy to use so that the user experience with the gaming device is not only enjoyable, but an experience that the user wants to duplicate.

A gaming device interface may be improved by incorporating additional user input devices, user output devices, or combinations thereof. Other solutions to improving interactions between humans and computers is to provide humans with machine-readable tokens or tags that, when presented to a computer, enable the computer to execute a particular function or provide some particular output. Again, in the context of casinos and gaming environments, users may be provided with tickets (e.g., a card or paper with a barcode or QR code printed thereon), loyalty cards (e.g., a plastic card having a magstripe provided thereon), or the like. A user may be allowed to present the ticket or loyalty card to a gaming device (e.g., by having the ticket scanned or swiping the plastic card through a magstripe reader) to cause the gaming device to perform some particular function.

BRIEF SUMMARY

In certain embodiments, the present disclosure relates to a method, gaming system, and server that enable gaming features with a tag having conductive, coded ink provided thereon. In some embodiments, a method of providing game features to a user is provided, comprising: providing a tag with an encoded physical medium that is readable by a touch-capable user interface; determining that the tag has been read by a touch-capable user interface of a gaming device in combination with detecting a gesture of the user at the touch-capable user interface of the gaming device; enabling the gaming device to provide a predetermined game feature in response to determining that the tag has been read by the touch-capable user interface of the gaming device in combination with detecting the gesture of the user at the touch-capable user interface of the gaming device; and updating an electronic record associated with the tag to indicate that the predetermined game feature has been enabled based, at least in part, on determining that the tag has been read by the touch-capable user interface of the gaming device in combination with detecting the gesture of the user at the touch-capable user interface of the gaming device.

In some embodiments, a gaming system is provided, comprising: a processor; and a computer-readable storage medium, coupled with the processor, comprising instructions that are executable by the processor, where the instructions comprise: a set of instructions that determine data encoded on a tag with a physical medium has been read by a touch-capable user interface of a gaming device in combination with detecting a gesture of a user at the touch-capable user interface of the gaming device; a set of instructions that enable the gaming device to provide a predetermined game feature in response to determining that the tag has been read by the touch-capable user interface of the gaming device in combination with detecting the gesture of the user at the touch-capable user interface of the gaming device; and a set of instructions that update an electronic record associated with the tag to indicate that the predetermined game feature has been enabled.

In some embodiments, a server is provided, comprising: a communication interface that facilitates machine-to-machine communications over a communication network; a processor coupled with the communication interface; and a computer-readable storage medium, coupled with the processor, comprising instructions that are executable by the processor, where the instructions comprise: a set of instructions that receive data read from a tag, wherein the data is encoded on the tag with a physical medium that is readable with a touch-capable user interface; a set of instructions that determine the data was read from the tag in combination with detecting a gesture of a user at the touch-capable user interface; a set of instructions that enable a gaming device to provide a predetermined game feature in response to determining that the tag has been read by the touch-capable user interface in combination with detecting the gesture of the user at the touch-capable user interface; and a set of instructions that update an electronic record associated with the tag to indicate that the predetermined game feature has been enabled at the gaming device Additional features and advantages are described herein and will be apparent from the following Description and the figures.

DETAILED DESCRIPTION

Figure 1:
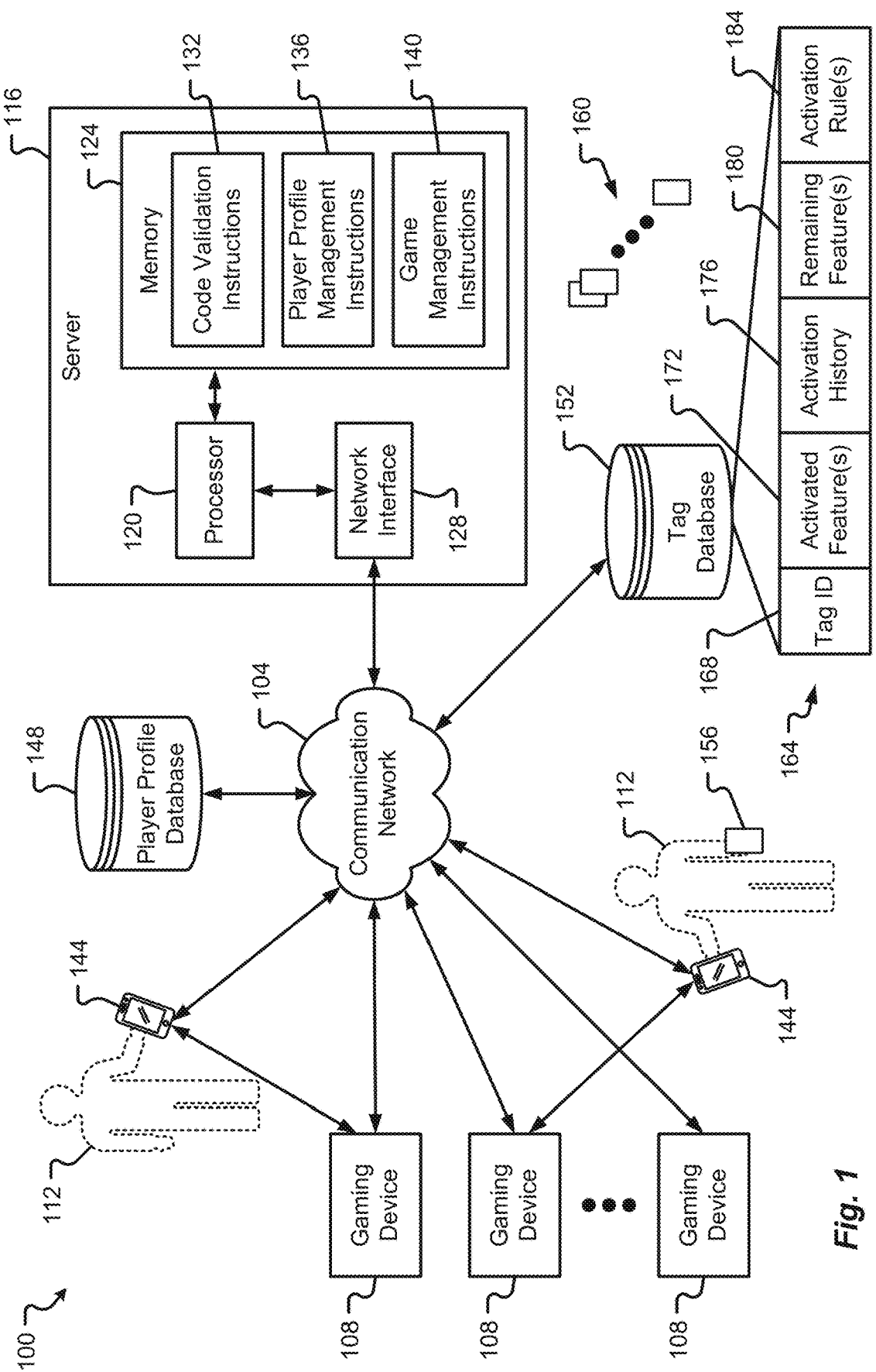
FIG. 1 is a block diagram of a gaming system accordance with embodiments of the present disclosure.

Embodiments of the present disclosure will be described in connection with a tag (e.g., an identification tag) having printed conductive, coded ink on at least one surface thereof. As will be described in further detail herein, the printed conductive, coded ink may correspond to one example of an encoded physical medium that is readable by a touch-capable user interface of a gaming device. The printed conductive, coded ink, in some embodiments, is readable by one or more capacitive sensors provided in the touch-capable user interface. While the term "printed" is used to refer to the conductive, coded ink, it should be appreciated that the ink may be applied to the tag using any type of material application process (e.g., inkjet printing, screen printing, masking, film deposition, Atomic Layer Deposition (ALD), adhesion, etc.). Another example of an encoded physical medium that is readable by a touch-capable user interface includes an optically-readable physical medium. The optically-readable physical medium may have data that is readable by a touch-capable user interface that employs optical sensors instead of or in addition to capacitive sensors. In some embodiments, the physical medium is encoded based on the pattern in which the physical medium is provided on the tag. As an example, the patterning of the physical medium when printed on the tag may be similar to the patterning of traditional ink when printing a barcode or QR code. The particular way in which the physical medium is provided on parts of the tag (and not provided on other parts of the tag) may be recognized and decoded by a device reading the tag with its touch-capable user interface.

Because the tag can have its encoded physical medium read by a touch-capable user interface, there is no need to equip a gaming device with additional interface devices for the sole purposes of reading data from the tag. Rather, the same interface device that is used to interact with a user (e.g., the touch-capable user interface) can also be used to read data from the tag. As compared with traditional magstripe cards, which require the gaming device to have a dedicated magstripe reader to read the magstripe card, gaming devices according to the present disclosure can read data from a tag with an interface device that is providing other capabilities and functions. This ultimately decreases the costs associated with producing a gaming device and increases the likelihood that users will enjoy their experience with the gaming device.

In some embodiments, the tag(s) described herein may take on many different types of form factors. For example, a tag could be a ticket, a voucher, or a plastic card. The tag may be activated by first putting it on any touch-capable user interface and by touching the tag at one or more predefined areas, so that the touch-capable user interface recognizes both the finger's position through the tag and the tag's unique code at the finger's specific position. Following, the unique code on the tag may trigger a certain action on the device.

Embodiments discussed herein may focus on such identification tags available in the casino or gaming environment, in terms of anonymous player tags with conductive, coded ink. This type of tag can be activated/used with any capacitive or optical-sensing device (e.g. an EGM's touch screen, a mobile communication device's touch screen, etc.). The tag might be a type of a re-usable, anonymous player tag with enhanced player interaction and with added functionality. One aspect of the present disclosure is to provide players with a personal but anonymous tag they can use within a casino environment and save information on, without giving the casino personal information.

Benefits provided by the present disclosure include, without limitation: the ability to avoid verifying personal contact information; easy and fast "account" creation and login (e.g., a player just has a tag with a unique tag identification (ID) number—but no need to share personal information, hand over signatures, or other confirmations); the anonymous tag can be activated with a simple gesture; enables the creation and saving of progress/settings/game statistics without person-related information; can be used with any capacitive or optical-sensing display device (e.g., no hardware upgrade is required and no card reader is required; and there becomes an opportunity of entirely substituting ticket-in/ticket-out devices in EGMs by using a player convenient, secure, and cost-saving alternative with conductive, coded ink tags.

In some embodiments, the user/player may be provided an anonymous player tag when they visit the casino. Specifically, the player would receive a new tag in "default mode" at the entrance (for free or for a fee). During the casino visit, the tag is useable at multiple different games and machines, data collected is saved to the card. At the end of the user's/player's visit the tag may be returned to the casino and data is deleted from the tag after the visit.

In an alternative embodiment, the user/player visiting the casino may be provided a new tag (for free or for a fee) and keep it as long as wanted, re-use it over multiple casino visits, and give it back or throw it away whenever it is no longer desired. The user/player may be allowed to keep the tag as a "personal casino card", although it doesn't contain private information.

One aspect of the present disclosure is to provide an anonymous player tag. In some embodiments, the tag has a unique tag ID so that the gaming system can clearly distinguish between different tags. The tag ID is in no way related to any type of personal player information—so the usage of these tags enables complete anonymity.

Another aspect of the present disclosure is to provide a database with server and ID-related information linked therein. In some embodiments, the tag's ID is stored in a database which administers multiple different tag IDs for a population of tags. To each tag ID, specific information might be linked (e.g., number of remaining uses, number of uses in the past, date of last usage, number of different usage types such as usage A or usage B, handout date of the tag, expiring date of the tag, etc.). The use of a database as disclosed herein may enable players to save play progress all while maintaining anonymity within the gaming system. For instance, playing progress made in the casino with a certain tag might be saved to the tag's ID. The progress made might be restored at an EGM at another time. Progress may be saved in a number of different ways. As one example, progress may be saved and then restored using EGM settings such as volume, language, and wager settings. As another example, loyalty and experience information may be saved and stored by tracking collected loyalty points or experience points as part of a casino loyalty program. As another example, cash information may be saved by transferring cash/credit information from a tag's memory to an EGM and vice versa. In this particular example, the tag ID may be used as an alternative to a ticket-in-ticket-out (TITO) system that causes each EGM to print a different ticket when a user is done playing the EGM. Instead, the information associated with the user's game play status at an EGM can be stored in connection with the tag ID at a centralized database and then retrieved from another EGM when the user presents their tag to the next EGM.

Another aspect of the present disclosure is to enable cross game and device usage. For instance, usage of a tag as disclosed herein may provide the ability of using one tag on multiple gaming machines of the same or different type. Activating a tag might enable different or similar functionality at different machines. Game progress, bonuses, experience points might be collected at EGM A and transferred to another EGM B to continue collecting there whereas EGM B might be of the same or another kind as EGM A.

Another aspect of the present disclosure is to provide a time-dependent activation context. In some embodiments, activating a tag in different activation contexts might lead to different activation actions in the gaming environment/casino. For instance, a context based on daytime may result in activating a tag with a daytime context that leads to other results than in the evening (e.g., happy hour between X p.m. and Y p.m. —where "All activations count double"). As another example, a context may be based on a casino event. In this example, activating a tag at a specific casino events might lead to other results than on a regular day (e.g. at an Egypt event, all activations on an Egyptian-themed EGM give better conditions). As yet another example, the tag activation may be based on game experience and the tag may be configured to trigger different actions at the gaming device based on activation history of the tag such as Activation 1: "Newcomer activation", Activation 2: "Advanced activation", and Activation 3: "Experienced activation".

As mentioned above, the tag may enable anonymity. The tag may also be configured to provide one or more additional privacy functions. In some embodiments, the tag might contain specific functions for player security/privacy matters to validate the user and prevent thievery (e.g. combine with an on-display code terminal, digital signage or similar lock mechanisms which only allow card activation by entering the correct code).

In some embodiments, the tag may facilitate reservations of another machine, for example during tournament participation. The tag may be used to reserve a free space at another gaming device by activating the tag at the current gaming device. The other gaming device may be locked for a period of time until the player has arrived at the other machine.

In some embodiments, personalized tags may be utilized. Instead of anonymous tags, also personalized tags are considerable because a tag's ID could be directly related to personal player information such as name, gender, age, etc., through which personalized offerings are enabled (e.g. birthday bonus, personal welcome greetings, etc.). In this way, the personalized tag may facilitate advanced features such as a connect to mobile feature. In a connect to mobile feature, the user could place the tag on a personal mobile communication device's screen to save and restore information via the mobile communication device. Enabling usage of a player's mobile communication device may result in cross-channel offerings such as transferring game progress from casino to online casino and vice versa. Likewise, the mobile communication device may be used to enable a secure and trusted connection to the player's personal bank account, thereby facilitating money transfers from the bank account to the tag ID and vice versa. Additional details will now be described for various in which a tag (whether anonymous or personalized) as disclosed herein may be used to enhance a player's experience in a gaming environment.

Gaming System

With reference initially to FIG. 1, details of an illustrative gaming system 100 will be described in accordance with at least some embodiments of the present disclosure. The components of the gaming system 100, while depicted as having particular instruction sets and devices, are not necessarily limited to the examples depicted herein. Rather, a system according to embodiments of the present disclosure may include one, some, or all of the components depicted in the system 100 and does not necessarily have to include all of the components in a single device. For instance, the components of a server 116 may be distributed amongst a plurality of servers and/or other devices (e.g., gaming devices, EGMs, mobile communication devices, etc.) in the system 100 without departing from the scope of the present disclosure.

The gaming system 100 is shown to include a communication network 104 that interconnects and facilitates machine-to-machine communications between one or multiple gaming devices 108, a server 116, and one or more databases 148, 152. It should be appreciated that the communication network 104 may correspond to one or many communication networks without departing from the scope of the present disclosure. In some embodiments, the gaming devices 108 and server 116 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming devices 108 may be distributed throughout a single property or premises (e.g., a single casino floor) or the gaming devices 108 may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 may utilize the same or different types of communication protocols to connect with the communication network 104. It should also be appreciated that the gaming devices 108 may or may not present the same type of game or wagering interface to a player 112. For instance, a first gaming device 108 may correspond to a gaming machine that presents a slot game to the player 112, the second gaming device 108 may correspond to a sports betting terminal, and other gaming devices 108 may present other types of games or a plurality of different games for selection and eventual play by a player 112. It may be possible for the some of the gaming devices 108 to communicate with one another via the communication network 104. In some embodiments, one or more of the gaming devices 108 may only be configured to communicate with server 116. Although not depicted, the system 100 may include a separate server (e.g., a gaming server, etc.) or collection of servers that are responsible for managing the operation of the various gaming devices 108 in the gaming system 100 and the server 116 may be primarily used for managing player account information and/or tag information. It should also be appreciated that the server 116 may or may not be co-located with one or more gaming devices 108 in the same property or premises. Thus, one or more gaming devices 108 may communicate with the server 116 over a WAN, such as the Internet. In such an event, a tunneling protocol or Virtual Private Network (VPN) may be established over some of the communication network 104 to ensure that communications between a gaming device and a remotely-located server 116 are secured.

A gaming device 108 may correspond to a type of device that enables player interaction in connection with making wagers, communicating, watching live competitive contests, and/or playing games of chance. For instance, the gaming devices 108 may correspond to a type of device that enables a first player 112 to interact with a second player 112 at respective gaming devices 108. In other embodiments, each player 112 may be enabled to play a game individually at a gaming device 108. Although each user 112 is depicted as carrying a mobile communication device 144 and the mobile communication device 144 is shown has being connectable with the gaming device 108, it should be appreciated that such a configuration is not required. Rather, a player 112 may be allowed to simply interact with a gaming device 108 and may or may not utilize a mobile communication device 108 for such interactions with the gaming device 108.

A gaming device 108 may include any type of known gaming device such as a slot machine, a table game, an electronic table game (e.g., video poker), a skill-based game, etc. The gaming device 108 can be in the form of an EGM, virtual gaming machine, video game gambling machine, etc. One particular type of gaming device 108 may include a mobile communication device 144 such as portable communications devices, personal computers, and/or other microprocessor-enabled devices having memory and communications interfaces. Non-limiting examples of a mobile communication device 144 include a cellular phone, a smartphone, a tablet, a wearable device, an augmented reality headset, a virtual reality headset, a laptop, a Personal Computer (PC), or the like. In addition to playing games and wagering on a gaming device 108, the players 112 may also be allowed to play games of chance and/or skill on respective mobile communication devices 144. In some embodiments, the mobile communication devices 144 may interact with another gaming device 108 to allow a player 112 to play games and/or engage with the server 116. The mobile communication device 144 may run an application that, among other things, enables the communications directly with the gaming device 108 and/or with the communication network 104. As provided above, the mobile communication device 144 may correspond to a player's 112 personal device (e.g., a smartphone) or to a device that is issued to the player 112 during the player's visit at a particular casino. It should be appreciated that the player 112 may play games directly on their mobile communication device 144 and/or the mobile communication device 144 may be in communication with another gaming device 108 such that the mobile communication device 144 provides the human-to-machine interface for the player 112 to the other gaming device 108. As shown in FIG. 1, the mobile communication device 144 may be in communication with the communication network 104 or in direct communication (e.g., via Bluetooth, WiFi, etc.) with another gaming device 108 in the gaming system 100.

The server 116 is further shown to include a processor 120, memory 124, and a network interface 128. These resources may enable functionality of the server 116 as will be described herein. For instance, the network interface 128 provides the server 116 with the ability to send and receive communication packets or the like over the communication network 104. The network interface 128 may be provided as a network interface card (NIC), a Slot Machine Interface Board (SMIB), a network port, a modem, drivers for the same, and the like. Communications between the components of the server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various game management, player authentication, and wager management functions of the server 116.

The memory 124 may include any type of computer memory device or collection of computer memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. As an example, the memory 124 may a player profile management instruction set 136 that enables the processor 120 to store data into a player profile database 148.

In addition to managing player profile information, the server 116 may also be provided with a code validation instruction set 132 that, when executed by the processor 120, enable the server 116 to manage tag ID numbers in a tag database 152. As will be discussed in further detail herein, the tag database 152 may contain rich data associated with a population of tags 160 including a tag 156 that has been activated by a user 112. Each tag 156 in the population of tags 160 may initially correspond to an inactivated tag and may remain in that state until such time as a player 112 presents the tag to an appropriate gaming device 108 or mobile communication device 144 to activate the tag. As will be discussed in further detail herein, activation of a tag 156 may require the player 112 to provide a gesture in combination with presenting the tag 156 to the gaming device 108 and/or mobile communication device 144. The gaming device 108 or mobile communication device 144 may provide information extracted from the tag 156 (and possibly information related to the player's 112 gesture) to the server 116. The server 116 may then utilize the code validation instruction set 132 to compare the data extracted from the tag 156 with data stored in the tag database 152 to determine whether to activate the tag and, if desired, whether to activate the tag 156 with a particular context or within a particular mode of operation (e.g., whether to enable certain features through future use of the tag 156). Although depicted as being separate from the server 116, the player profile database 148 and the tag database 152 (or data represented therein) may be stored internal to the server 116 (e.g., within the memory 124 of the server 116 rather than in a separate database).

As will be discussed in further detail herein, a gesture may correspond to any action, motion, movement, combination of actions, combination of motions, combinations of movements, or the like that are taken by the user 112 or that are imparted to an object (e.g., a stylus) by the user 112 and that are recognizable by the gaming device 108 or mobile communication device 144. The way in which a gesture is recognizable by a gaming device 108 or mobile communication device 144 may depend upon the nature of the user interface provided on the gaming device 108 or mobile communication device. In some embodiments, a gesture may only be recognizable by the gaming device 108 or mobile communication device 144 if there is a physical contact made between the user 112 (or an object moved by the user 112) and the user interface of the gaming device 108 or mobile communication device 144. A touch-capable user interface having an array of capacitive sensors may correspond to a user interface that requires physical contact. Alternatively, a touch-capable user interface having one or more optical sensors that are used to detect and track motion of a user 112, motion of a user's 112 finger, or motion of an object may not necessarily require direct physical contact to recognize motion and, therefore, recognize a gesture provided by the user. Non-limiting examples of gestures may include a tap, multiple taps within a predetermined amount of time, a touch, a swipe, a multi-directional swipe, a multi-finger touch, a multi-finger tap, a multi-finger swipe, drawing objects, palm presses, combinations thereof, or the like.

The memory 124 is also depicted to include a game management instruction set 140. The game management instruction set 140, when executed by the processor 120, may enable the server 116 to facilitate various gameplay features and functions at the gaming devices 108 and/or mobile communication devices 144. For instance, the game management instruction set 140 may be configured to manage wagers placed by players 112 at gaming devices 108 and/or mobile communication devices 144, track game states at gaming devices 108 and/or mobile communication devices 144, determine outputs to provide to the player 112 via a gaming device 108 and/or mobile communication device 144, and/or manage game rules, settings, or preferences within the gaming system 100.

The player profile management instruction set 136, when executed by the processor 120, may enable the server 116 to manage one or more data fields for a player profile, for example, stored in the player profile database 148 and/or cause a gaming device 108 to update an appropriate credit meter for the player 112 within the gaming device being played by the player 112. In some embodiments, the player profile management instruction set 136 may be configured to create one or more player profiles and associated data structures within the player profile database 148. A player profile, in some embodiments, may include player 112 identification information and a wager account record for the player. In some embodiments, the player profile management instruction set 136 may be responsible for managing electronic records of all players 112 within the gaming system 100 or a subset of players 112 within the gaming system 100. In some embodiments, the player profile management instruction set 136 may be responsible for updating a player profile to indicate that an associated player 112 is attempting to earn a bonus or jackpot based on an aggregation of events that can occur within the gaming system 100. The player profile management instruction set 136 may be configured to work in synchronization with the code validation instruction set 132 to update a player profile in response to a player 112 activating a tag 156 and/or using a tag 156 during gameplay at a gaming device 108 and/or mobile communication device 144. The player profile management instruction set 136 may also be configured to manage an anonymous player's 112 account based on that player's utilization of a tag 156 within the system 100. Thus, benefits associated with a player loyalty account, for example, may be provided to an anonymous player 112 (e.g., a player 112 that does not have any personal information stored in the player profile database 148 or that is playing in an anonymous manner) based on the player's 112 use of the tag 156 during gameplay. In some embodiments, if the player 112 has registered the tag 156 during gameplay, any accumulated credits or benefits may be stored onto the tag 156 or may be communicated to the player profile database 148 to be stored in association with an identifier of the tag 156 such that when the tag 156 is presented to a new gaming device 108, the new gaming device 108 may read the accumulated credits or benefits from the tag 156 or from the player profile database 148 with reference to an identifier of the tag 156 and make the accumulated credits or benefits available to the player 112 during gameplay at the new gaming device 108.

As will be discussed in further detail herein, the tag database 152 may be used to store one or many different data structures 164 in the form of an electronic record, ledger entry, or the like for purposes of enabling players 112 to interact with devices in the gaming system 100. The illustrative data structure 164 may include a number of data fields that can be managed, updated, and queried by the various instruction sets stored in memory 124. The data fields, in some embodiments, may correspond to fields used to track activity related to players 112 and their use of tags 156 as well as to track the status of the population of tags 160 (e.g., prior to a tag 156 from the population of tags 160 being activated). Illustrative and non-limiting examples of fields that may be included in the data structure 164 include a tag identifier field 168, an activated feature(s) field 172, an activation history field 176, a remaining feature(s) field 180, and an activation rule(s) field 184.

The tag identification field 168 may be used to store information that uniquely identifies a particular tag 156 from among other tags in the population of tags 160. In some embodiments, the tag identification field 168 may store a numerical string, an alphanumerical string, or any other value that can be used to identify a tag 156 within the gaming system 100. The tag identification field 168 may also contain information describing a type of the tag 156 and/or whether the tag 156 belongs to a particular group of tags having certain capabilities.

The activation feature(s) field 172 may be used to store information describing the type(s) of gaming features that have been activated in response to a player 112 presenting the associated tag 156 to a particular gaming device 108 (e.g., via a direct presentation of the tag 156 to a gaming device 108 or via presenting the tag 156 to a gaming device 108 in combination with providing a gesture to the gaming device 108). In some embodiments, the activated feature(s) field 172 may also describe the type of feature that was activated by the player 112 and/or a number of times that a particular gaming feature has been activated by a player 112.

The activation history field 176 may be used to store information describing events related to game feature activations, tag activations, or the like. For instance, the activation history field 176 may describe information related to an activation of a particular tag 156. Such information may include a gaming device 108 to which the tag 156 was presented, a time at which the tag 156 was presented, whether the presentation resulted in an initial activation or a re-activation of the tag 156, and the like. Alternatively or additionally, the activation history field 176 may describe information related to an activation of a gaming feature based on a presentation of the tag 156 to a gaming device 108. In this way, the activation history field 176 may include information that references one or more entries in the activated feature(s) field 172.

The remaining feature(s) field 180 may be used to store information describing any gaming features that are still eligible to be activated via the associated tag 156. The remaining feature(s) field 180 may describe the type of gaming feature(s) that are still available for activation via use of the tag 156 and/or a counter value that indicates a number of remaining activations available for a particular gaming feature.

The activation rule(s) field 184 may be used to store information describing any rules or restrictions (e.g., conditions) related to an activation of a particular gaming feature and/or related to the activation of a tag 156. In some embodiments, the activation rule(s) field 184 may store timing information, tag data, and/or gestures describing whether and when a particular gaming feature or tag 156 can be activated (or is ineligible for activation). Similarly, the activation rule(s) field 184 may store one or more algorithms that are executed to determine if a presentation of a tag 156 to a gaming device 108 qualifies a particular gaming feature to be activated.

Gaming Device

Figure 2:
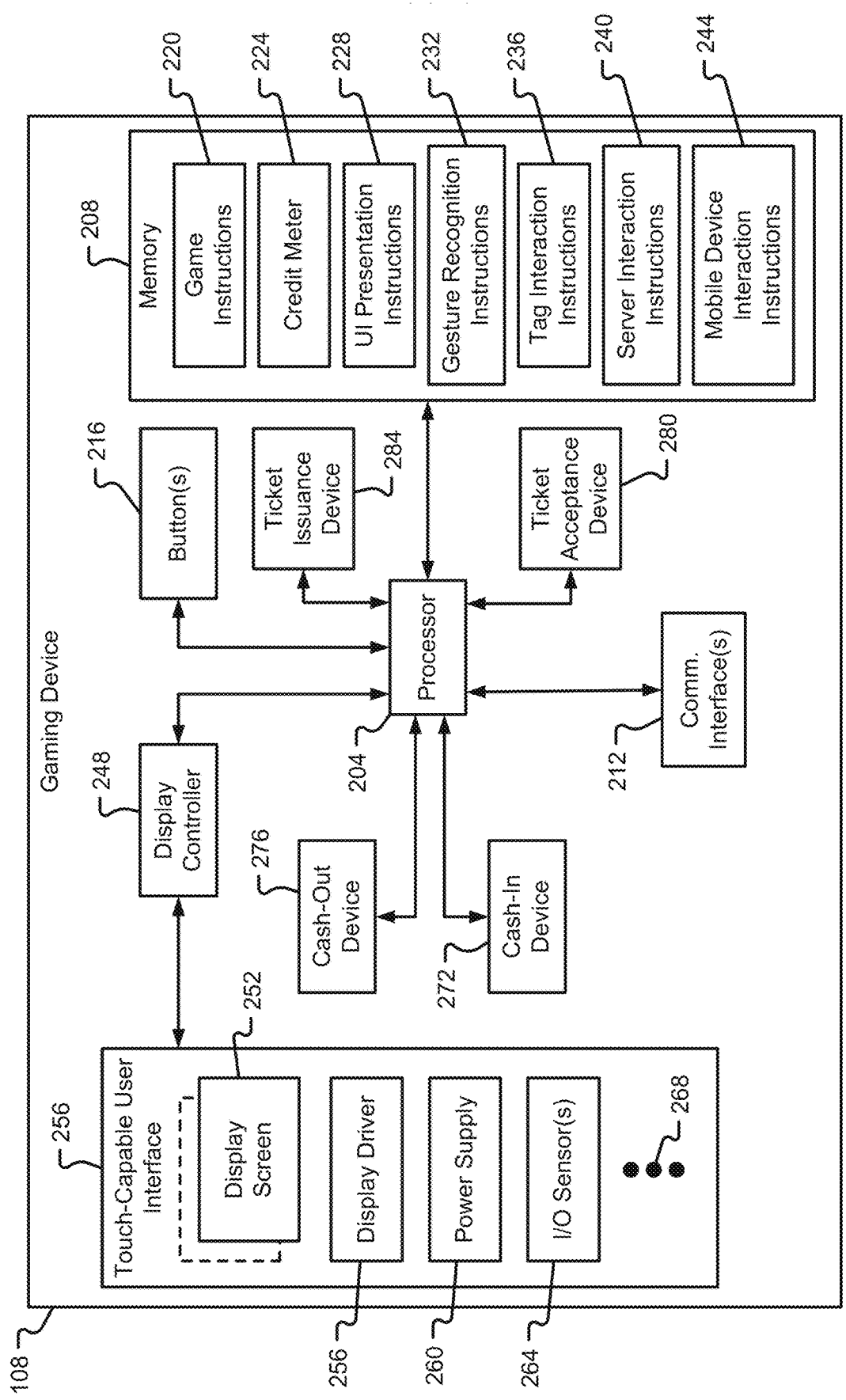
FIG. 2 is a block diagram depicting an illustrative gaming device in accordance with embodiments of the present disclosure.

With reference now to FIG. 2, additional details of a gaming device 108 will be described in accordance with at least some embodiments of the present disclosure. While depicted as a gaming device 108, it should be appreciated that some or all of the components of a single gaming device 108 may be distributed across multiple gaming devices 108 (of the same or different type) without departing from the scope of the present disclosure. Moreover, as will be discussed in further detail with reference to FIG. 3, some or all of the components of a gaming device 108 may be provided in a mobile communication device 144, or vice versa, without departing from the scope of the present disclosure.

The gaming device 108 is depicted to include a processor 204, memory 208, a communication interface 212, one or more buttons 216, a display controller 248, a touch-capable user interface 256, a cash-in device 272, a cash-out device 276, a ticket acceptance device 280, and a ticket issuance device 284. In some embodiments, the processor 204 may be similar or identical to the processor 120. In other words, the processor 204 may correspond to one or many microprocessors, CPUs, microcontrollers, or the like. The processor 204 may be configured to execute one or more instruction sets stored in memory 208.

The communication interface 212 may also be similar or identical to network interface 128. The nature of the communication interface 212, however, may depend upon whether the communication interface 212 is provided in a gaming device 108 or mobile communication device 144. Examples of a suitable communication interface 212 include, without limitation, an Ethernet port, a USB port, an RS-232 port, an RS-485 port, a NIC, an antenna, a driver circuit, a modulator/demodulator, etc. The communication interface 212 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure. In some embodiments, the communication interface 212 may include different communications ports that interconnect with various input/output lines. For example, a first communications port may provide an interconnection (e.g., via at least one Ethernet, RJ-11, RJ-45, or other communications port) between the communication interface 212 and the server 116. Continuing this example, a second communications port of the communication interface 212 may provide an interconnection between the communication interface 212 and another gaming device 108.

The button(s) 216 may correspond to any type of mechanical or software-based input device. In some embodiments, the button(s) 216 may be provided on a common panel or portion of the gaming device 108 and may be used to initiate a predetermined function in response to being pressed by the player 112. A button 216, as can be appreciated, may alternatively or additionally take the form of one or more depressible buttons, a lever or "one armed bandit handle," etc. A button 216 may include one or more mechanically-actuatable components or may correspond to a predetermined area of a display that is configured to receive a user input.

As compared to the touch-capable user interface 256, the button(s) 216 may primarily operate as an input device for the gaming device 108 whereas the touch-capable user interface 256 may correspond to a combination user input/user output device. The touch-capable user interface 256 may be configured to render information, live video, communications windows, wagering interface windows, games, interactive elements, Graphical User Interface (GUI) elements, gaming icons, and/or other visual outputs to one or more display screens 252. The gaming device 108 may include one or more display controllers 248 configured to control an operation of the touch-capable user interface 256. This operation may include the control of input (e.g., player 112 input via the touch-capable user interface 256 via the instruction sets in memory 208, reading of a tag 156 via the touch-capable user interface 256, combinations thereof, etc.), control of output (e.g., display, rendered images, visual game behavior, etc.), and/or control of other functions of the touch-capable user interface 256.

The touch-capable user interface 256 may include one or more display screens 252 that are configured to selectively activate pixels and/or display elements to render one or more games, windows, indicators, interactive elements, icons, characters, lights, images, etc. One, some, or all of the pixels may also include a corresponding Input/Output (I/O) sensor 264 that is used to detect an object in proximity with or in contact with the touch-capable user interface 256. Examples of the display screen 252 may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens 252 may be separated into a main display and a secondary display. In a gaming device 108 context, the main display may correspond to a display arranged in a first viewing position of a player 112 and the secondary display may correspond to a display arranged in a second (e.g., higher) viewing position of the player 112. It is an aspect of the present disclosure that the gaming device 108 may include any number of display screens 252 in any arrangement or orientation (e.g., stacked, side-by-side, staggered, overlapped, angled, and/or combinations thereof). As described herein the touch-capable user interface 256 may be configured to render information in one or more discrete areas (e.g., windows, portions, zones, backgrounds, etc.) of the display screen 252 or superimposed in an area of the display screen 252. Furthermore, the tag 156 may be configured to be readable by the touch-capable user interface 256. In some embodiments, a capacitive or optical sensor may be provided as the I/O sensor 264 to enable the touch-capable user interface 256 to read data encoded on a tag 156.

The touch-capable user interface 256 may also include a display driver 256, a power supply 260, and/or other components 268 configured to enable operation of the touch-capable user interface 256. The display driver 256 may receive commands and/or other data provided by the processor 204 and one or more of the instruction sets in memory 208. In response to receiving the commands, the display driver 256 may be configured to generate the driving signals necessary to render the appropriate images to the display screen 252. The power supply 260 may provide electric power to the components of the touch-capable user interface 256. In some embodiments, the power supply 260 may include a transformer and/or other electronics that prevent overloading, condition power signals, and/or provide backup power to the touch-capable user interface 256.

As mentioned above, the I/O sensor(s) 264 may correspond to one or more devices for recognizing an object in proximity with or in contact with a surface of a display screen 252. As can be appreciated, depending upon the type of sensor used, an object's proximity within a predetermined distance of the display screen 252 may be registered as "in contact" or "touching" the display screen 252 and, therefore, may be registered as contact between the object and the touch-capable user interface 256. In some embodiments, a touch-capable user interface 256 may be configured to respond to objects of various types (e.g., a player's 112 hand, a player's finger 112, a tag 156, etc.

The memory 208 may be similar or identical to memory 124. For instance, the memory 208 may include one or multiple computer memory devices that are volatile or non-volatile. The memory 208 may be configured to store instruction sets that enable player 112 interaction with the gaming device 108, that enable tag 156 interactions with the gaming device 108, that enable mobile communication device 144 interactions with the gaming device 108, and that enable communications with the server 116. Examples of instruction sets that may be stored in the memory 208 include a game instruction set 220, a credit meter 224, a User Interface (UI) presentation instruction set 228, a gesture recognition instruction set 232, a tag interaction instruction set 236, a server interaction instruction set 240, and a mobile device interaction instruction set 244.

In some embodiments, the game instruction set 220, when executed by the processor 204, may enable the gaming device 108 to facilitate one or more games of chance or skill and produce interactions between the player 112 and the game of chance or skill. In some embodiments, the game instruction set 220 may include subroutines that present one or more graphics to the player 112 via the touch-capable user interface 256, subroutines that calculate whether a particular game wager has resulted in a win or loss during the game of chance or skill, subroutines for determining payouts for the player 112 in the event of a win, subroutines for exchanging communications with a connected server (e.g., game management server, server 116, or the like), subroutines for enabling the player 112 to engage in a game using their mobile communication device 144, and any other subroutine or set of instructions that facilitate gameplay at or in association with the gaming device 108.

The credit meter 224 may correspond to a device or collection of devices that facilitates a tracking of wager activity or available wager credits at the gaming device 108. In some embodiments, the credit meter 224 may be used to store or log information related to various player 112 activities and events that occur at the gaming device 108. The types of information that may be maintained in the credit meter 224 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108. In some embodiments, the credit meter 224 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming device 108, and the like. Some or all of the data within the credit meter 224 may be reported to the server 116, for example, if such data applies to a centrally-managed game. As an example, the number, value, and timing of wagers placed by a particular player 112 and payouts on such wagers may be reported to the server 116.

The UI presentation instruction set 228, when executed by the processor 204, may enable the gaming device 108 to provide various display and/or auditory presentations for a game played on the gaming device 108. The UI presentation instruction set 228 may instruct one or more speakers of the gaming device 108 to play sounds that indicate a status (e.g., a win, a loss, a push, etc.) of the wager made. The UI presentation instruction set 228 may provide one or more commands to the display controller 248 and the touch-capable user interface 256 to control a rendered output throughout a player's 112 gaming session.

The gesture recognition instruction set 232, when executed by the processor 204, may enable the gaming device 108 to recognize and react to particular player 112 inputs provided to the button(s) 216 and/or touch-capable user interface 256. In some embodiments, the gesture recognition instruction set 232 may be configured to map inputs received at a touch-capable user interface 256 to a predetermined gesture or desired input for a game. Similarly, the gesture recognition instruction set 232 may further map a predetermined gesture to a command that is executed by some other instruction set in the gaming device 108. In some embodiments, gestures recognized by the gesture recognition instruction set 232 may be communicated to the game instruction set 220 to enable the game instruction set 220 to produce a particular game output, event, or display in response to the detected gesture.

The tag interaction instruction set 236, when executed by the processor 204, may enable the gaming device 108 to read data from a tag 156 via the touch-capable user interface 256. In some embodiments, the gesture recognition instruction set 232 and tag interaction instruction set 236 may operate on similar inputs received from the touch-capable user interface 256 (e.g., capacitive readings, optical sensor readings, etc.), but the tag interaction instruction set 236 may be configured to extract data encoded on the tag 156 based on the inputs received from the touch-capable user interface 256. In this way, the tag interaction instruction set 236 may enable the gaming device 108 to read data from a tag 156 with the touch-capable user interface 256 and provide that data to the server 116 and/or to other components of the gaming device 108 to enable further actions at the gaming device 108.

The server interaction instruction set 240, when executed by the processor 204, may enable the gaming device 108 to exchange communications with the server 116. In some embodiments, the server interaction instruction set 240 may be configured to prepare, format, and send messages to the server 116 via the communication network 104 (e.g., as communication packets). The server interaction instruction set 240 may also be configured to receive messages from the server 116 via the communication network 104 and extract that commands, data, and instructions from those messages. In other words, the server interaction instruction set 240 may be used by other instruction sets in memory 208 to facilitate interactions with the server 116.

The mobile device interaction instruction set 244, when executed by the processor 204, may enable the gaming device 108 to exchange communications with the mobile communication device 144. The mobile device interaction instruction set 244 may be configured to manage a device-to-device pairing between the gaming device 108 and mobile communication device 144 (e.g., an NFC pairing, Bluetooth pairing, WiFi connection, etc.). The mobile device interaction instruction set 244 may also be configured to ensure that the gaming device 108 is only paired and communicating with a single mobile communication device 144 of the player 112 at a given time, rather than pairing and communicating with any and all mobile communication devices within communication range of the gaming device 108. The mobile device interaction instruction set 244 may also be configured to manage the communication protocols used between the gaming device 108 and mobile communication device 144.

The cash-in device 272 may include a bill acceptor, a coin acceptor, a chip acceptor or reader, or the like. In some embodiments, the cash-in device 272 may also include credit card reader hardware and/or software. The cash-out device 276 may operate and issue cash, coins, tokens, or chips based on an amount indicated within the credit meter 224. In some embodiments, the cash-out device 276 may include a coin tray or the like and counting hardware configured to count and distribute an appropriate amount of coins or tokens based on a player's 112 winnings or available credit within the credit meter 224.

The gaming device 108 may also be provided with a ticket acceptance device 280 that is configured to accept or scan physically-printed tickets/vouchers and extract appropriate information therefrom. In some embodiments, the ticket acceptance device 280 may include one or more machine vision devices (e.g., a camera, IR scanner, optical scanner, barcode scanner, etc.), a physical ticket acceptor, a shredder, etc. The ticket acceptance device 280 may be configured to accept physical tickets and/or electronic tickets without departing from the scope of the present disclosure. An electronic ticket/voucher may be accepted by scanning a one-dimensional barcode, two dimensional barcode, or other type of barcode or quick response (QR) code displayed by a player's 112 mobile communication device 144, for example.

The ticket issuance device 284 may be configured to print or provide physical tickets/vouchers to players 112. In some embodiments, the ticket issuance device 284 may be configured to issue a ticket/voucher consistent with an amount of credit available to a player 112, possibly as indicated within the credit meter 224.

Mobile Communication Device

Figure 3:
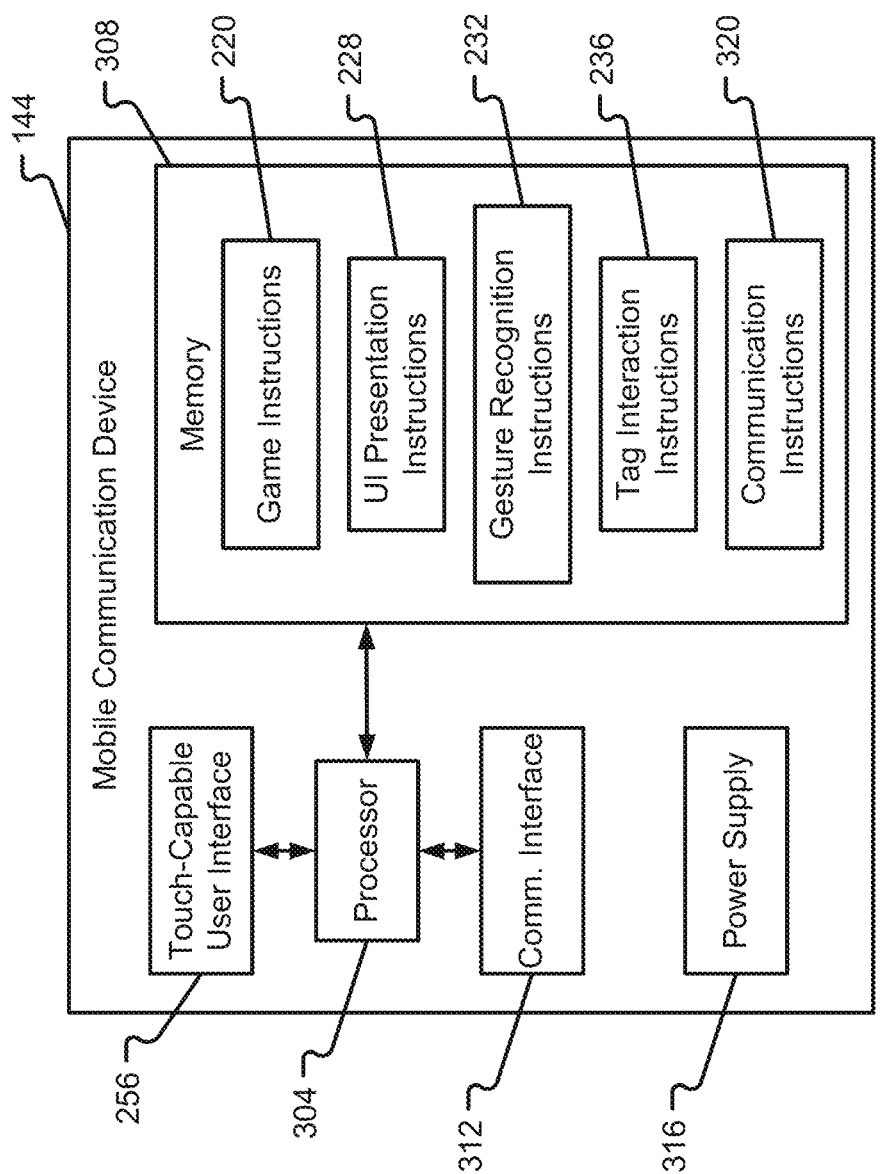
FIG. 3 is a block diagram depicting a mobile communication device in accordance with embodiments of the present disclosure.

With reference now to FIG. 3, additional details of a mobile communication device 144 will be described in accordance with at least some embodiments of the present disclosure. The mobile communication device 144 is shown to include a processor 304, memory 308, a communication interface 312, and a touch-capable user interface 256. In some embodiments, the processor 304 may be similar or identical to any of the other processors 120, 204 depicted and described herein and may correspond to one or many microprocessors, CPUs, microcontrollers, Integrated Circuit (IC) chips, or the like. The processor 304 may be configured to execute one or more instruction sets stored in memory 308. In some embodiments, the instruction sets stored in memory 308, when executed by the processor 304, may enable the mobile communication device 144 to provide game play functionality, interact with gaming machines 112, pair with gaming machines 112, detect player 112 gestures, read data from a tag 156, or any other type of desired functionality.

The communication interface 312 may be similar or identical to the network interface 128 and/or communication interface 212 depicted and described herein. The nature of the communication interface 312 may depend upon the type of communication network 104 for which the mobile communication device 144 is configured. Examples of a suitable communication interfaces 312 include, without limitation, a WiFi antenna and driver circuit, a Bluetooth antenna and driver circuit, a cellular communication antenna and driver circuit, a modulator/demodulator, etc. The communication interface 312 may include one or multiple different network interfaces depending upon whether the mobile communication device 144 is connecting to a single communication network 104 or multiple different types of communication networks. For instance, the mobile communication device 144 may be provided with both a wired communication interface 312 and a wireless communication interface 312 without departing from the scope of the present disclosure.

The touch-capable user interface 256 may include a combination of a user input and user output device as described herein above. The touch-capable user interface 256 of the mobile communication device 144 may be similar or identical to the touch-capable user interface 256 of the gaming device 108.

The memory 308 may be similar or identical to other memory 124, 208 depicted and described herein and may include one or multiple computer memory devices that are volatile or non-volatile. The memory 308 may be configured to store instruction sets that enable player interaction with the mobile communication device 144 and that enable game play at the mobile communication device 144. Examples of instruction sets that may be stored in the memory 308 include a game instruction set 220, a UI presentation instruction set 228, a gesture recognition instruction 232, a tag interaction instruction set 236, and a communication instruction set 320. In addition to the instruction sets, the memory 308 may also be configured to store data that is useable by the various instruction sets. Examples of such data that may be stored in memory 308 include, without limitation, user preferences, tag information, and the like.

The functionality and capabilities of the game instruction set 220, UI presentation instruction set 228, gesture recognition instruction set 232, and tag interaction instruction set 236 may be similar to those described in connection with the gaming device 108.

The communication instruction set 320, when executed by the processor 304, may enable the mobile communication device 144 to communicate via the communication network 104. As an example, the communication instruction set 320 may be configured to enable cellular, WiFi, and/or Bluetooth communications with other devices. The communication instruction set 320 may follow predefined communication protocols and, in some embodiments, may enable the mobile communication device 144 to remain paired with a gaming device 108 as long as the mobile communication device 144 is within a predetermined proximity (e.g., 20-30 feet, an NFC communication range, or a Bluetooth communication range) and paired with the gaming machine 112.

The power supply 316 may correspond to an internal power supply that provides AC and/or DC power to components of the mobile communication device 144. In some embodiments, the power supply 316 may correspond to one or multiple batteries. Alternatively or additionally, the power supply 316 may include a power adapter that converts AC power into DC power for direct application to components of the mobile communication device 144, for charging a battery, for charging a capacitor, or a combination thereof.

Gesture/Tag Read Examples

Figure 4A:
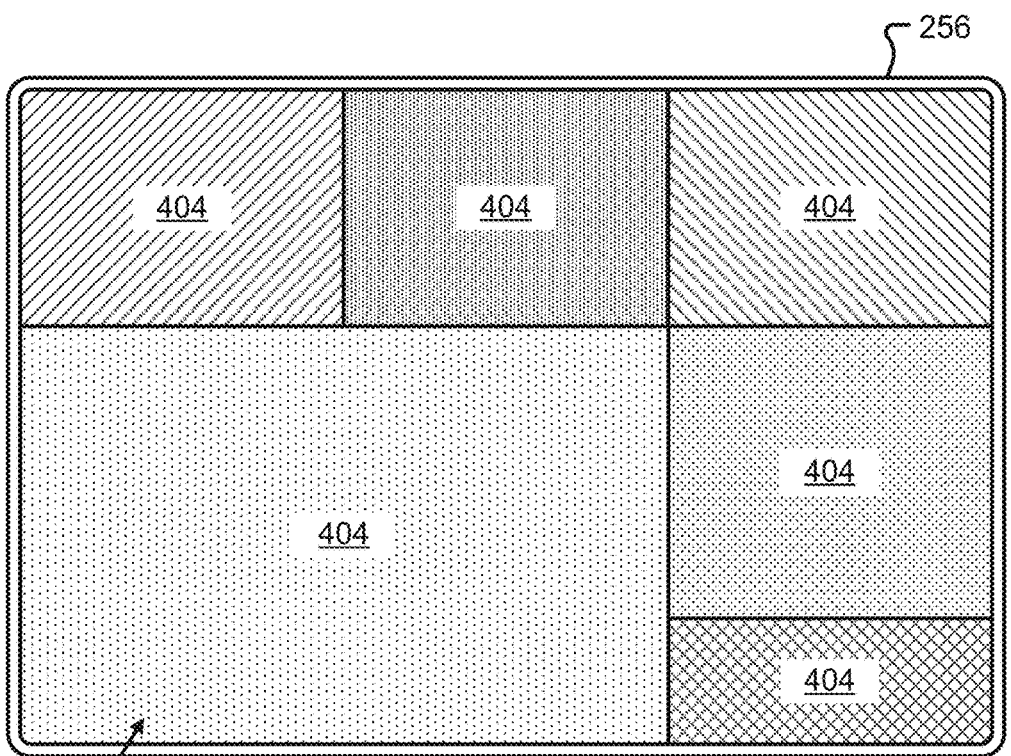
FIG. 4A is a first image of a touch-capable user interface in accordance with embodiments of the present disclosure.

With reference now to FIGS. 4A-4J various examples of detecting a user gesture alone or in combination with detecting a tag 156 and reading data from a tag 156 via a touch-capable user interface 256 will be described in accordance with at least some embodiments of the present disclosure. Referring initially to FIG. 4A, components of a touch-capable user interface 256 will be described.

As discussed herein, a gaming device 108 or mobile communication device 144 may utilize the touch-capable user interface 256 to display information related to a game, detect and recognize a player's 112 gesture, and read data from a tag 156.

The touch-capable user interface 256 may be used to render any casino game, live video, and/or wagering information with a display area 400 of the touch-capable user interface 256. The display area 400 may be provided in some or all of a particular display screen 252 or with multiple display screens 252. The display area 400 may be separated into two or more display portions or sub-areas 404. Although shown as including six different portions 404, it should be appreciated that the display area 400 may include greater or fewer portions 404, in similar or different proportions and/or sizes, than illustrated in FIG. 4A. In addition, one or more windows, display elements, or interactive features may cross over one or more of the portions 404 illustrated in FIG. 4A. The display portions 404 may or may not also correspond to predetermined input areas of the touch-capable user interface 256. As will be discussed in further detail herein, the placement of a tag 156 at a particular location (e.g., within a particular portion 404) of the display area 400 and reading of data from the tag 156 with sensors located in that particular location may cause different actions to occur at the gaming machine 108 and/or mobile communication device 144.

Figure 4B:
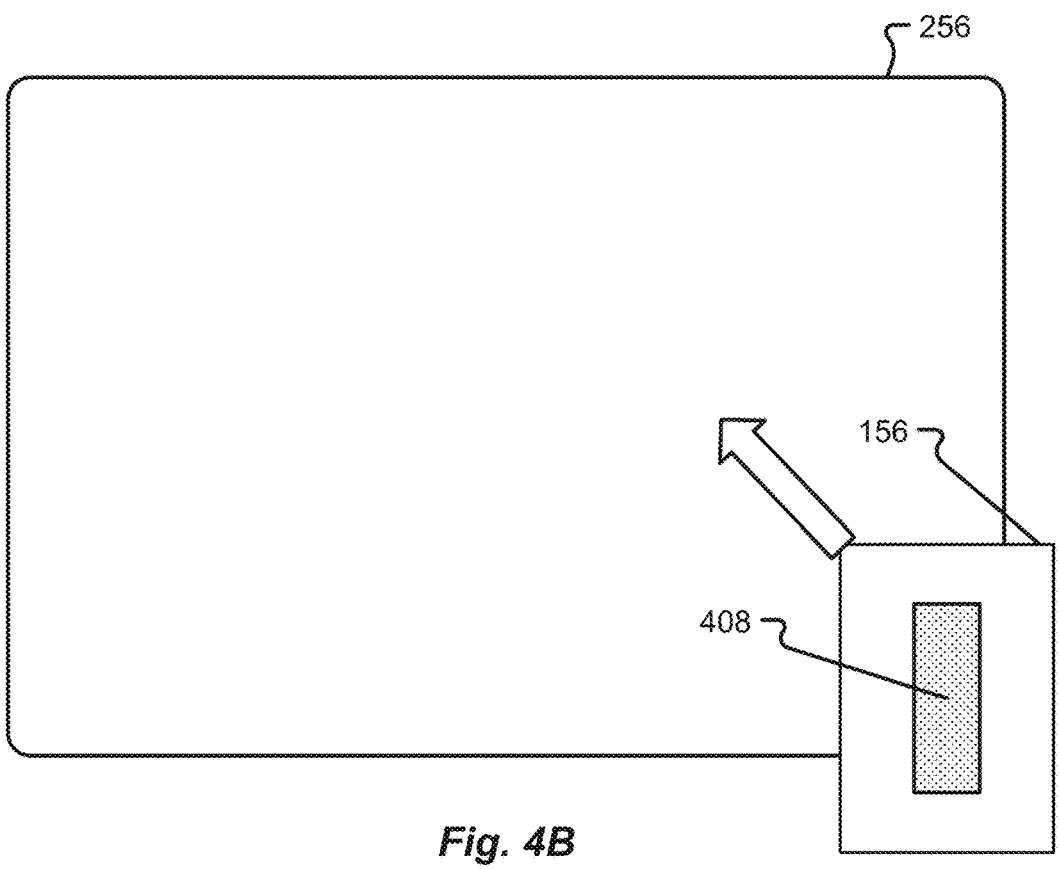
FIG. 4B is an image of a touch-capable user interface with an approaching tag in accordance with embodiments of the present disclosure.

FIG. 4B illustrates a tag 156 being brought within proximity of the touch-capable user interface 256. In some embodiments, the tag 156 may include an encoded physical medium 408 on one or multiple surfaces of the tag 156. The touch-capable user interface 256 may be configured to read data from the encoded physical medium 408 using its various I/O sensors 264.

Figure 4C:
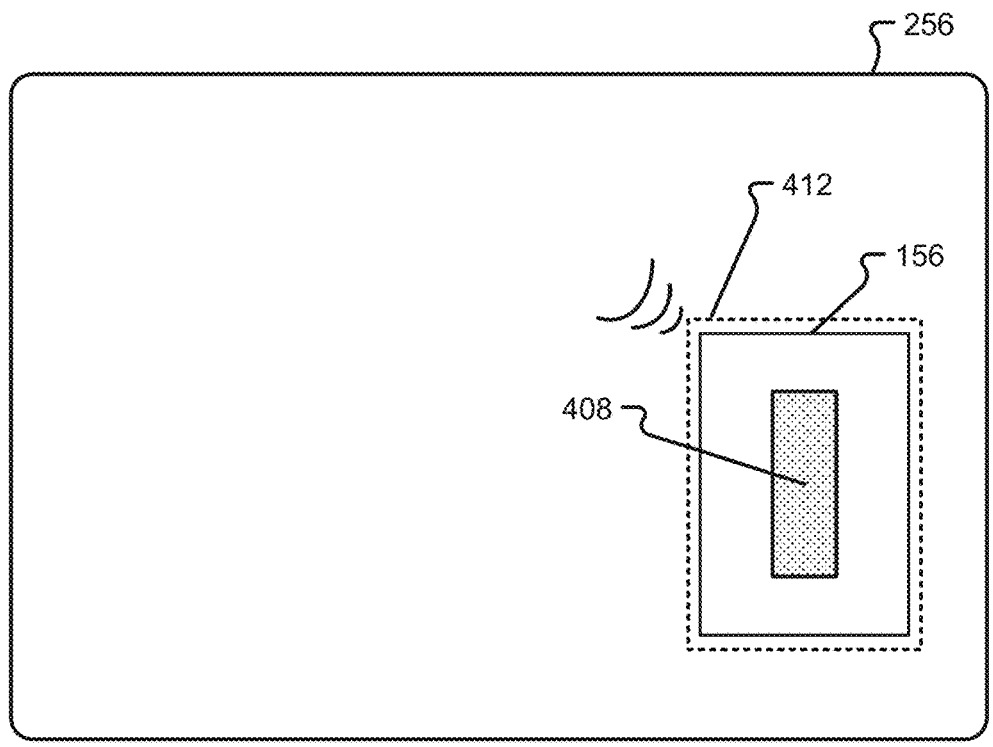
FIG. 4C is an image of a tag contacting a touch-capable user interface in accordance with embodiments of the present disclosure.

FIG. 4C illustrates the tag 156 being placed into proximity or physical contact with the touch-capable user interface 256. It is also shown that the orientation (e.g., placement, position, angle, etc.) of the tag 156 is detected within a contact area 412 of the touch-capable user interface 256. In some embodiments, behavior of the gaming device 108 and/or mobile communication device 144 may depend upon where the contact area 412 is positioned relative to the portions 404 of the display area 400. For instance, one function may be performed if the contact area 412 (e.g., the area in which the tag 156 is detected) is coincident with a first portion 404 whereas a different function may be performed if the contact area 412 is coincident with a second portion 404 that is different from the first portion.

Figure 4D:
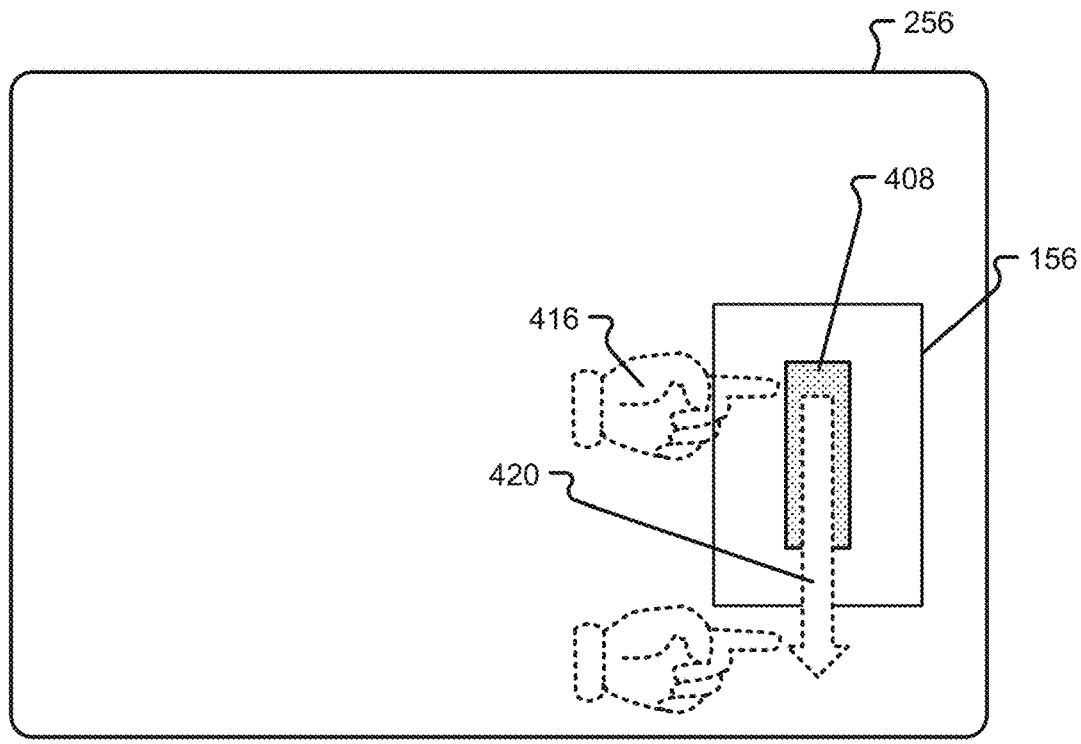
FIG. 4D is a first example of a user gesture provided in combination with a tag having data read by a touch-capable user interface in accordance with embodiments of the present disclosure.

FIG. 4D illustrates that a player's hand 416 may also be used to provide a gesture 420 input to the touch-capable user interface 256. In some embodiments, the gesture 420 input may be provided within the contact area 412, meaning that the same sensors used to extract data from the encoded physical medium 408 are also used to detect motion of the player's hand 416 in connection with registering the gesture 420.

Figure 4E:
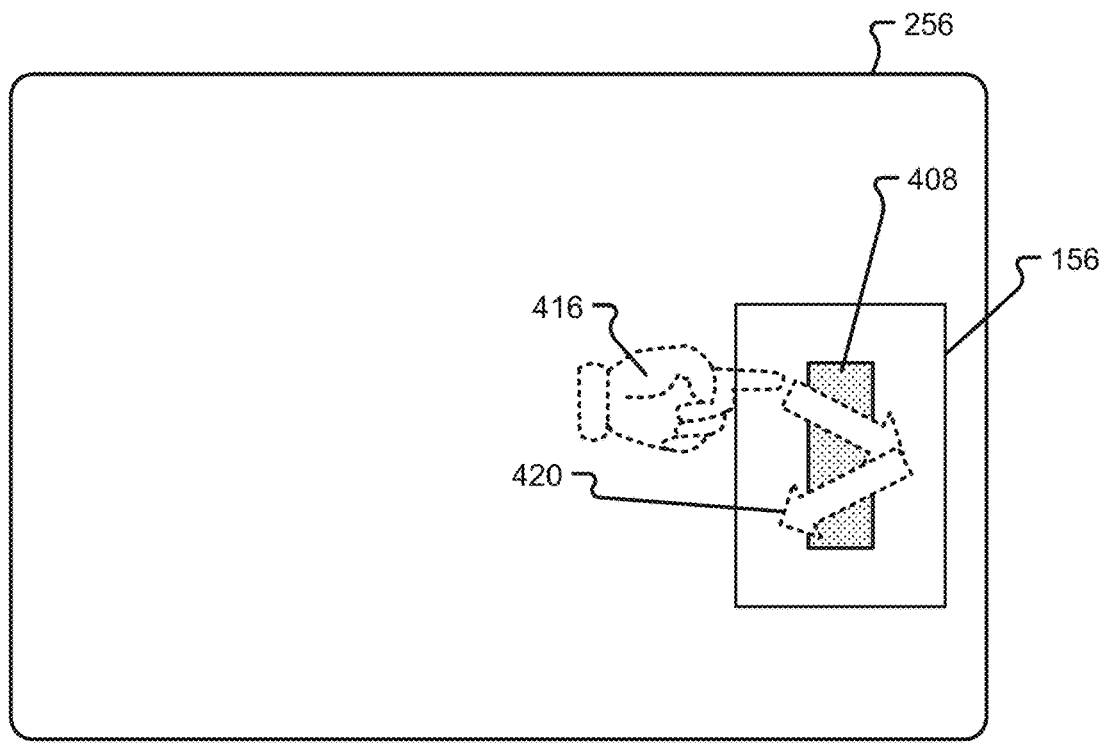
FIG. 4E is a second example of a user gesture provided in combination with a tag having data read by a touch-capable user interface in accordance with embodiments of the present disclosure.
Figure 4F:
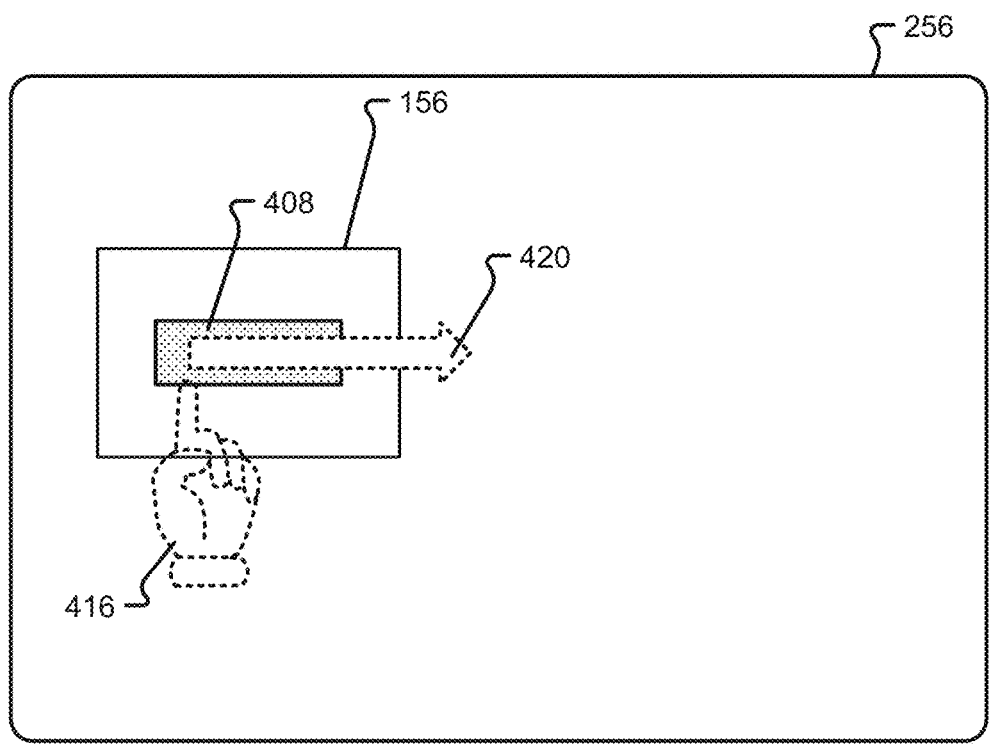
FIG. 4F is a third example of a user gesture provided in combination with a tag having data read by a touch-capable user interface in accordance with embodiments of the present disclosure.

As can be seen in FIG. 4E, the motion of the gesture 420 may vary, even if the tag 156 is positioned within the same contact area 412. Different gestures 420 may be used to drive different outputs or behaviors of the gaming device 108 and/or mobile communication device 144. Likewise, as shown in FIG. 4F, a different direction of the gesture 420 in combination with positioning the tag 156 at a different portion 404 of the touch-capable user interface 256 may cause the gaming device 108 and/or mobile communication device 144 to perform different functions or read the encoded physical medium 408 in a different way.

Figure 4G:
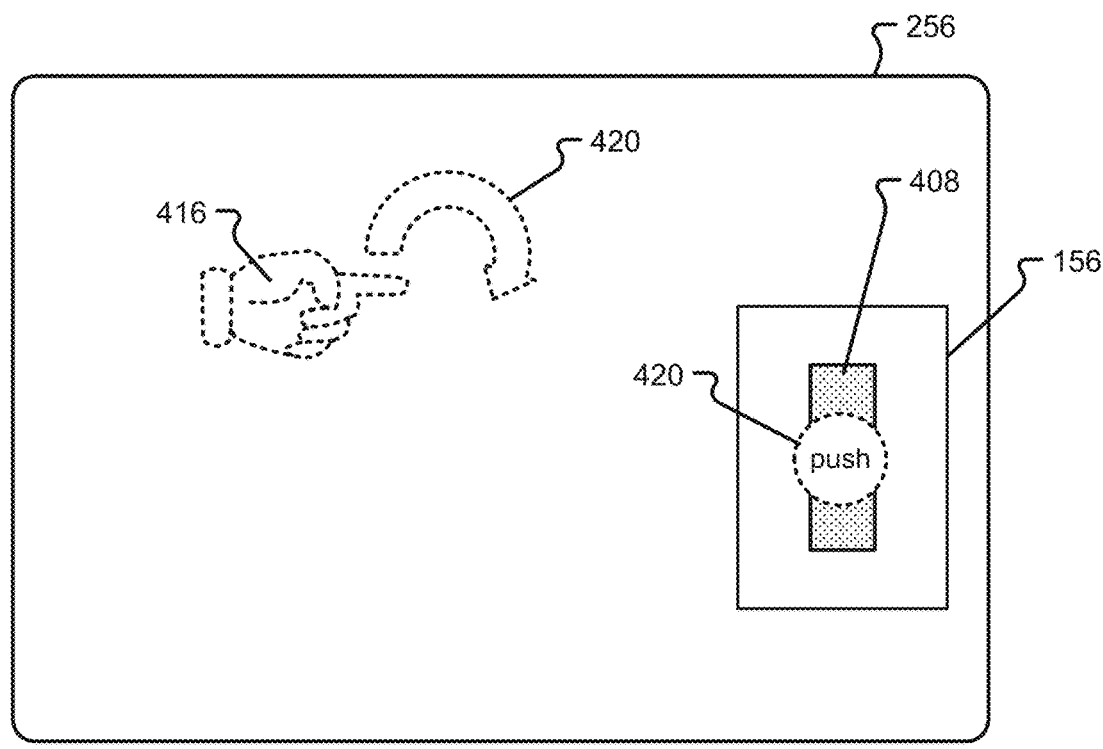
FIG. 4G is a fourth example of a user gesture provided in combination with a tag having data read by a touch-capable user interface in accordance with embodiments of the present disclosure.

In some embodiments and as shown in FIG. 4G, it may be possible to provide one or more gestures 420 outside the contact area 412 and such gestures, when registered in combination with the detection of the tag 156 in contact or proximity with the touch-capable user interface 256, may cause the gaming device 108 or mobile communication device 144 to perform different actions. In some embodiments, the different actions may correspond to performing different game play functions, enabling different game features, enabling different bonus features, making different wagers, etc. As can be appreciated, if the gesture 420 is not provided directly within the contact area 412, then it may be useful to push the tag 156 into contact with the touch-capable user interface 256 while performing the additional gesture 420 outside the contact area 412. This contact between the tag 156 and touch-capable user interface 256 may enable the touch-capable user interface 256 to read data from the encoded physical medium 408.

Figure 4H:
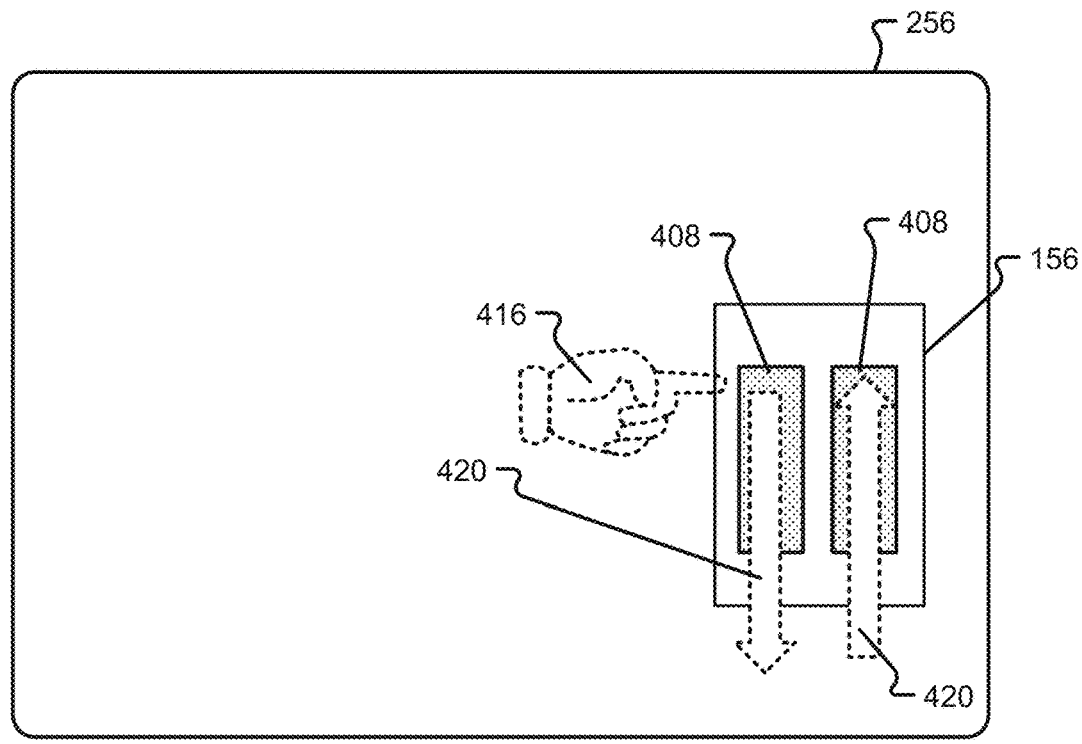
FIG. 4H is a fifth example of a user gesture provided in combination with a tag having data read by a touch-capable user interface in accordance with embodiments of the present disclosure.

FIG. 4H illustrates a tag 156 having multiple encoded physical media 408 thereon, where each encoded physical medium 408 occupies a different area of the tag 156. In some embodiments, a first gesture 420 may be registered relative to and overlapping with the first encoded physical medium 408 and then a second gesture 420 may be registered relative to and overlapping with the second encoded physical medium 408. The way in which the first and/or second gesture 420 are registered may depend upon the type of touch-capable user interface 256 being used and/or the way in which the physical medium 408 is provided on the tag 156. For instance, if the encoded physical medium 408 is printed on the tag 156 as conductive ink and the touch-capable user interface 256 registers a touch-based gesture 420 with capacitive sensors, then the first and/or second gesture 420 may be registered when the user physically contacts or presses the tag 156 into the touch-capable user interface 256 with enough force to cause the capacitive sensors of the touch-capable user interface 256 to recognize where the encoded physical medium 408 is printed on the tag 156 (and where the encoded physical medium 408 is not printed on the tag 156). As discussed above, the first and/or second gesture 420 may correspond to any type of known gesture such as a touch, tap, swipe, swirl, multi-finger touch, multi-finger tap, multi-finger swipe, palm press, or combination thereof. The first and/or second gesture 420 does not necessarily need to include any motion simultaneous with contacting the touch-capable user interface 256; rather, the first and/or second gesture 420 may include any user motion that is recognizable by the touch-capable user interface 256 based on the sensors provided in the touch-capable user interface 256. Providing a tag 156 with this type of configuration may enable different game play features to be performed depending upon which encoded physical medium 408 has the gesture 420 overlapping therewith and/or depending upon a direction of the gesture 420 itself. In some embodiments, the different encoded physical media 408 may have the same data encoded thereon or may have different data encoded thereon and the different data may be used to cause the gaming device 108 or mobile communication device 144 to perform different functions.

Figure 4I:
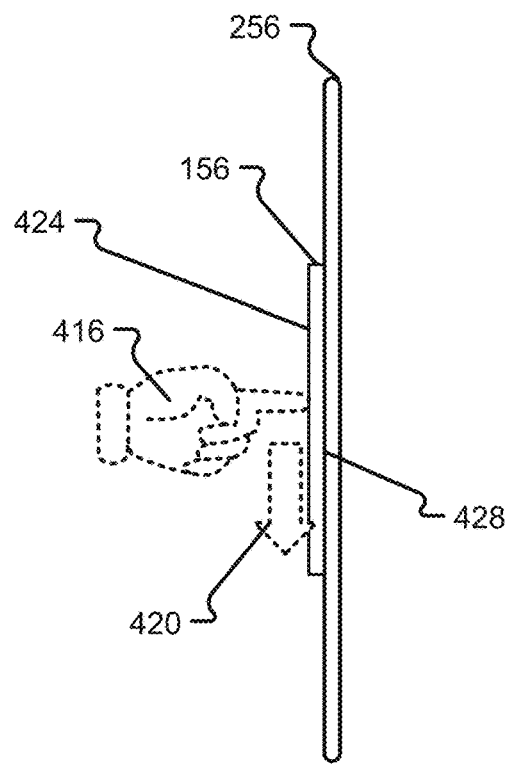
FIG. 4I illustrates a side view of a user gesture being provided in combination with a tag having data read by a touch-capable user interface in accordance with embodiments of the present disclosure.

FIG. 4I illustrates a cross-sectional view of a touch-capable user interface 256, a tag 156, and a player's 156 hand 416 relative to both the touch-capable user interface 256 and tag 156. In some embodiments, the tag 156 may be provided with a first surface 424 and an opposing second surface 428. The first surface 424 may correspond to a surface that interacts with the player's hand 416 whereas the second surface 428 may correspond to a surface that interact with the touch-capable user interface 256. In some embodiments, registration of a user gesture 420 and reading of data from the tag 156 at substantially the same time may require that the second surface 428 of the tag 156 be placed into close proximity or physical contact with the touch-capable user interface 256 and the player's hand 416 be placed into physical contact with the first surface 424. Thereafter, motion of the player's hand 416 may cause the touch-capable user interface 256 to simultaneously recognize the gesture 420 and read data from the encoded physical medium 408, which is positioned on the second surface 428 of the tag 156.

Although the player's hand 416 is depicted and described as a hand, it should be appreciated that any object (whether handheld, a finger, etc.) can be used to perform the same function as described in connection with the player hand 416. For instance, a stylus may be used to provide a gesture 420 in combination with the reading of data from the tag 156. It should also be appreciated that a gesture 420 may correspond to motion of the tag 156 relative to the touch-capable user interface 256. For instance, touch-capable user interface 256 may recognize a gesture 420 as an action in which the player's hand 416 moves the tag 156 relative to the touch-capable user interface 256. Other gestures 420 may include multi-touch gestures or multiple motions recognized by the touch-capable user interface 256 over an extended period of time (e.g., an amount of time greater than 2 seconds).

Figure 4J:
FIG. 4J illustrates a gaming user interface in accordance with embodiments of the present disclosure.

FIG. 4J illustrates an example gaming user interface where a contact area 412 is provided in a particular display portion 404. If and when a tag 156 is placed into close proximity or physical contact with the contact area 412 and then a gesture 420 is registered within the contact area 412, the gaming device 108 and/or mobile communication device 108 may be configured to perform a particular game feature. For instance, the player 112 may be allowed to unlock a wild feature or bonus feature by placing a tag 156 within the contact area 412 and then providing the appropriate gesture 420 in combination with placing the tag 156 within the contact area 412.

Methods

With reference now to FIGS. 5-12, various methods will be described in accordance with at least some embodiments of the present disclosure. It should be appreciated that the disclosed methods may be performed by one, some, or all of the devices depicted and described herein. Said another way, any device within the gaming system 100 may be used to perform some or all of a method depicted and described herein. Moreover, although certain steps are depicted as being performed in a certain order or in connection with a particular method, it should be appreciated that any method step depicted and described herein may be performed in combination with any other method step depicted and described herein.

Figure 5:
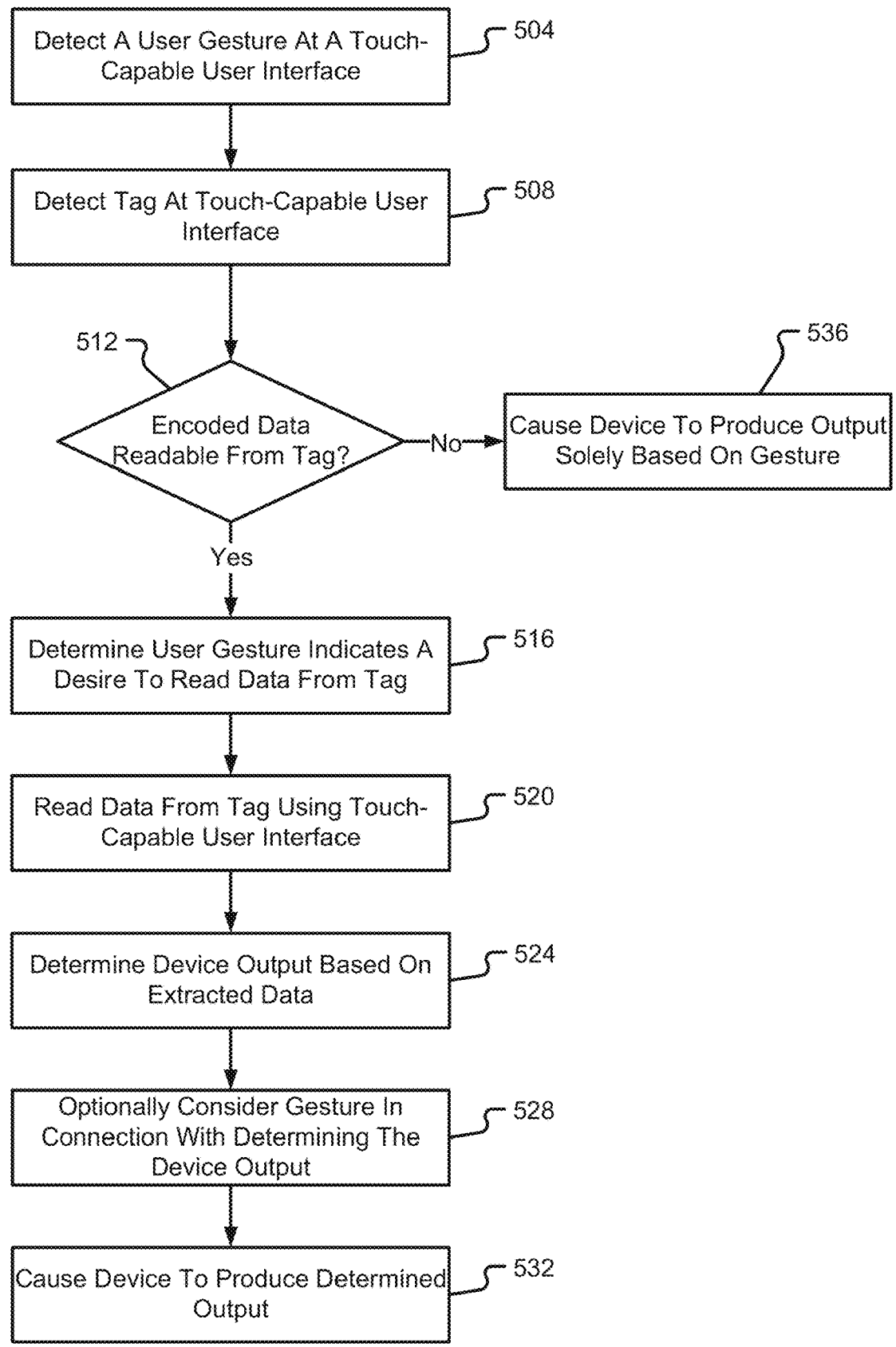
FIG. 5 is a flow diagram depicting a first method of enabling user interactions with a gaming device in accordance with embodiments of the present disclosure.

Referring initially to FIG. 5, a first method of enabling user interactions with a gaming device 108 (or mobile communication device 144) will be described in accordance with embodiments of the present disclosure. The method begins by detecting a user gesture 420 at a touch-capable user interface 256 (step 504). The method continues by detecting a tag 156 at the touch-capable user interface 256 (step 508). In some embodiments, the gesture 420 and tag 156 may be detected at substantially the same time or within a predetermined minimum amount of time. In some embodiments, the gesture 420 and tag 156 may be detected within the same contact area 412 of the touch-capable user interface 256; however, it may be possible that the gesture 420 and tag 156 are detected in different portions 404 of the touch-capable user interface 256.

The method may then continue by determining whether the tag 156 has data encoded thereon with an encoded physical medium 408 (step 512). This may occur naturally, as a result of detecting the tag 156 or it may occur as a result of the gesture 420 being provided in combination with placing the tag 156 in close physical proximity or physical contact with the touch-capable user interface 256. If no encoded physical medium 408 is detected on the tag 156, then the method may continue with the gaming device 108 or mobile communication device 144 operating and producing an output solely based on the gesture 420 (step 536).

If, however, the query of step 512 is answered positively, then the method may continue by determining whether or not the gesture 420 indicates a desire to read data from the tag 156 (step 516). This determination may depend upon a location of the gesture 420 (e.g., whether or not the gesture 420 overlaps the contact area 412 of the tag 156) and/or depending upon a direction of the gesture 420. If it is determined that data is to be read from the tag 156, then the method continues with the tag interaction instruction set 236 reading the data from the tag 156 via the touch-capable user interface 256 (step 520). The reading of data from the tag 156 may be performed via capacitive sensing, optical sensing, or a combination thereof, depending upon the capabilities of the touch-capable user interface 256.

The method then continues by determining an output to perform with the gaming device 108 or mobile communication device 144, based at least in part on the extracted data (step 524). In some embodiments, as will be discussed in further detail herein, the device output may depend upon whether the tag 156 is already activated within the gaming system 100 or whether the tag 156 has yet to be activated within the gaming system 100. Optionally, the gesture 420 may also be considered in connection with determining the action to perform at the gaming device 108 or mobile communication device 144 (step 528). The method will then continue by enabling the gaming device 108 or mobile communication device 144 to perform the determined action (e.g., provide the determined output) based on the extracted tag data and, optionally, the gesture 420 (step 532).

Figure 6:
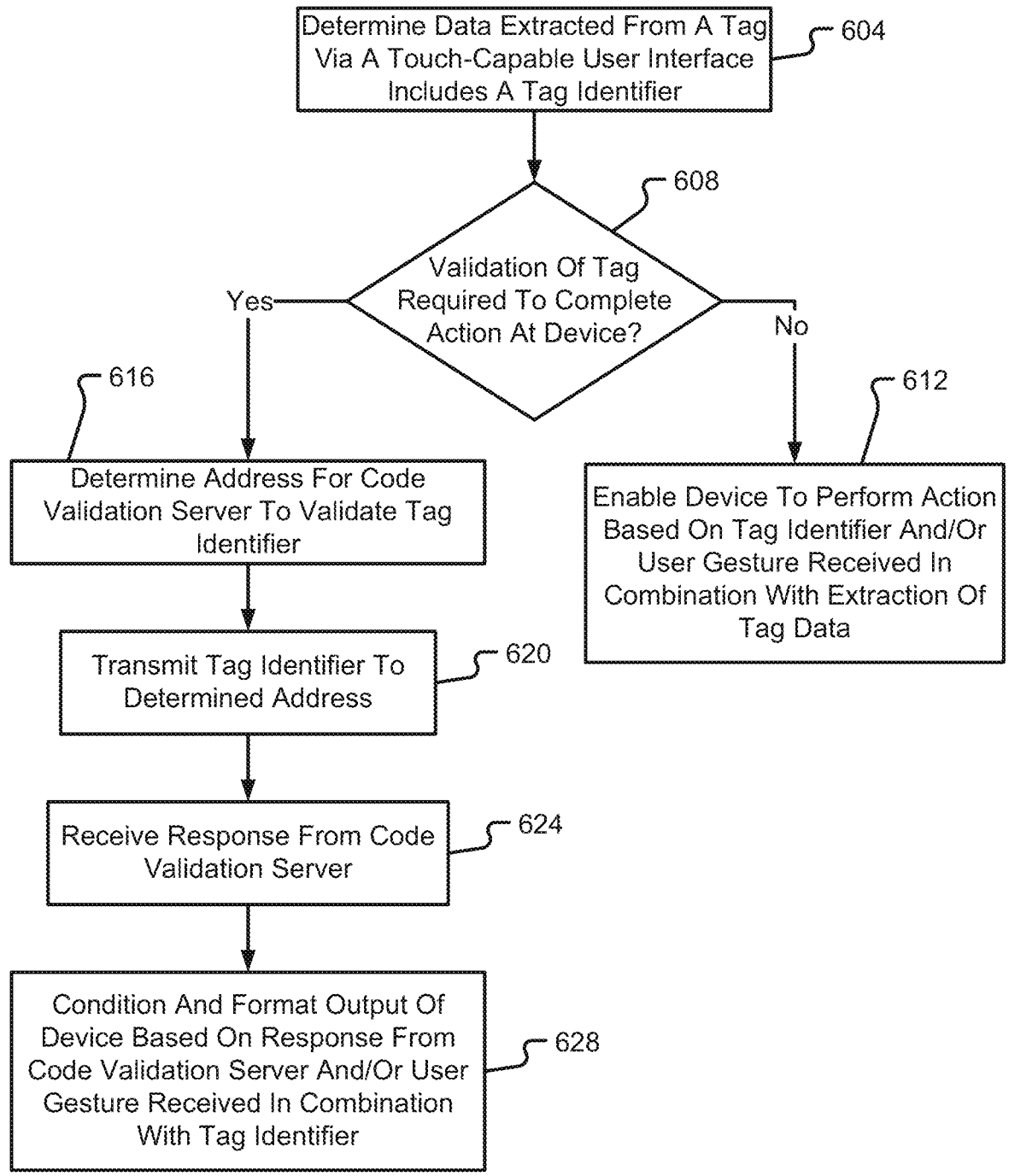
FIG. 6 is a flow diagram depicting a second method of enabling user interactions with a gaming device in accordance with embodiments of the present disclosure.

With reference now to FIG. 6, a second method of enabling user interactions with a gaming device 108 or mobile communication device 144 will be described in accordance with at least some embodiments of the present disclosure. The method begins by determining that data extracted from a tag 156 via a touch-capable user interface 256 includes a tag ID (step 604). The tag ID may be provided in any suitable format (e.g., number, alphanumeric string, hexadecimal code, etc.). The identification of the data as including a tag ID may be made by the tag interaction instruction set 236 and may depend upon detecting the data in a particular and expected format (e.g., a format consistent with known tag IDs).

Upon determining that the tag data includes a tag ID, the method continues with the tag interaction instruction set 236 providing the tag ID to the game instruction set 220, where it is determined whether or not the tag ID requires validation to enable further functions at the gaming device 108 or mobile communication device 144 that are provided by the tag 156 (step 608). If the tag ID does not require validation, then the gaming device 108 or mobile communication device may be enabled to perform an action based on the tag ID and/or the user gesture 420 received in combination with reading the tag ID (step 612). In some embodiments, validation of the tag ID may not be required if the tag ID has previously been validated and the tag 156 is now identified as activated, if the action to be performed does not require validation of the tag ID, and/or the gaming device 108 or mobile communication device 144 has already validated the tag ID within a predetermined amount of time (e.g., during a current gaming session).

If the query of step 608 indicates a need to validate the tag ID (e.g., to activate the tag 156), then the method continues with the gaming device 108 or mobile communication device 144 determining a network address for the server 116 that will be used to perform the code validation (step 616). This may be automatically determined if there is a single/central server 116 used for validation purposes. Alternatively, the gaming device 108 or mobile communication device 144 may perform a network discovery routine and query known servers as to which server should be used for tag ID validation purposes.

The method will then continue with the gaming device 108 or mobile communication device 144 transmitting the tag ID to the determined address (step 620). The gaming device 108 or mobile communication device 144 will then wait for a response from the server 116. Once the server 116 provides the response to the tag ID validation request (step 624), the method may then continue with the gaming device 108 or mobile communication device conditioning its output or actions based on the response received from the server 116. In some embodiments, the output or actions performed by the gaming device 108 or mobile communication device 144 may also depend upon the tag ID itself and whether the tag ID was previously activated and had predetermined functions/features already earned in connection with the tag ID and stored in the tag database 152 (e.g., which game play features are already associated with the tag ID within the tag database 152).

Figure 7:
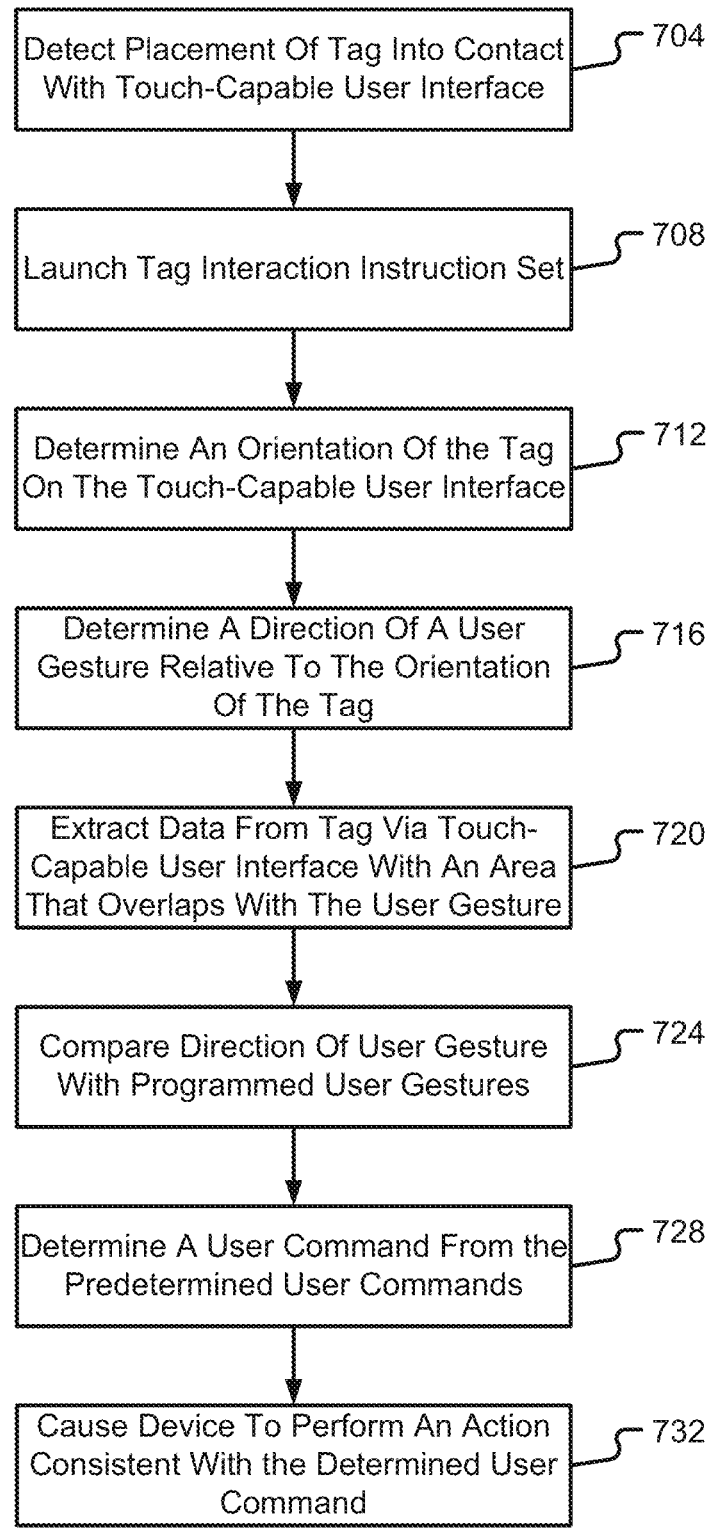
FIG. 7 is a flow diagram depicting a third method of enabling user interactions with a gaming device in accordance with embodiments of the present disclosure.

With reference now to FIG. 7, a third method of enabling user interactions with a gaming device 108 or mobile communication device 144 will be described in accordance with at least some embodiments of the present disclosure. The method begins by detecting the placement of a tag 156 into contact with a touch-capable user interface 256 (step 704). The method then continues with the processor 204, 304 executing the tag interaction instruction set 236 (step 708). When executing the tag interaction instruction set 236, processor 204, 304 determines an orientation of the tag 156 on the touch-capable user interface 256 (step 712). As part of determining the orientation of the tag 156, processor 204, 304 may determine a position of the tag 156 relative to certain portions 404 of the touch-capable user interface 256, a rotational position of the tag 156 (e.g., whether horizontally-oriented, vertically-oriented, diagonally-oriented, etc.), or combinations thereof.

As the processor 204, 304 is registering an orientation of the tag 156, the processor 204, 304 may also execute the gesture interaction instruction set 232 to determine a direction of a user gesture 420 relative to the orientation of the tag 156 (step 716). In particular, the processor 204, 304 may exchange information between the gesture interaction instruction set 232 and the tag interaction instruction set 236 to determine if the gesture 420 overlaps the tag 156, what direction the gesture 420 was provided relative to the tag 156, and the like. This step may also include detecting an encoded physical medium 408 in combination with detecting the gesture 420. If the encoded physical medium 408 is detected in combination with the gesture 420, then the method continues with the tag interaction instruction set 236 extracting data from the encoded physical medium 408 of the tag 156 (step 720).

The method then continues by comparing a direction of the gesture 420 (and possibly relationship of the direction with the tag 156) with preprogrammed user gestures that are maintained by the gesture recognition instruction set 232 (step 724). In this step, the method may also include referencing data extracted from the tag 156 (or determining a validity of the tag ID) to determine if the user gesture can be used as a user input and drive a user command. The method may then continue by determining that the direction of the user gesture corresponds to a particular user command from the programmed user gestures (step 728). The command, when executed by the gaming device 108 or mobile communication device 144 may cause the device to perform an action consistent with the user command (step 732). In some embodiments, performance of the user command may depend upon whether or not the tag has been successfully activated with the server 116 and/or whether the gesture successfully mapped to a recognized/programmed user gesture.

Figure 8:
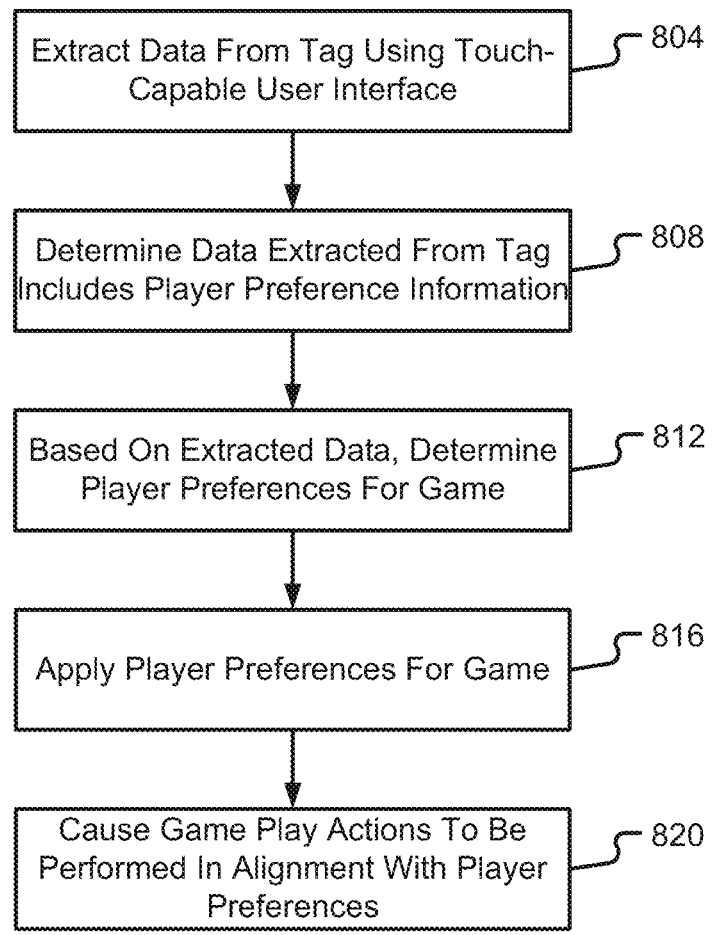
FIG. 8 is a flow diagram depicting a fourth method of enabling user interactions with a gaming device in accordance with embodiments of the present disclosure.

With reference now to FIG. 8, another method of enabling user interactions with a gaming device 108 or mobile communication device 144 will be described in accordance with at least some embodiments of the present disclosure. The method begins by extracting data that has been encoded on the tag 156 with an encoded physical medium 408 (step 804). In particular, the data is received at the touch-capable user interface 256 and then extracted by processor 204, 204 when executing the tag interaction instruction set 236.

The method then continues by determining that the extracted data includes or is associated with player preference information (step 808). This determination may be made locally at the gaming device 108 or mobile communication device 144 (e.g., with assistance of game instructions 220). Alternatively or additionally, the gaming device 108 or mobile communication device 144 may provide the extracted data to the server 116 where it is determined (e.g., with reference to the tag database 152 and player profile database 148) that the extracted data is associated with player preference information. Alternatively or additionally, the extracted data may itself include the player preference information.

Based on the extracted data, the method continues with the processor 204, 304 executing the game instruction set 220 and determining the player preferences for the game and, possibly, for enabling or disabling features of the gaming machine 108 or mobile communication device 144 during game play (step 812). The processor 204, 304 will then apply the player preferences to the game (step 816) and cause game play actions to be performed in accordance with the player preferences (step 820). It should be appreciated that player preferences may define wager preferences, bonus spin/play preferences, cash out preferences, device behavior preferences (e.g., lighting preferences, sound preferences, etc.), UI skin preferences, and the like. Any preferences capable of being accommodated by the current gaming device 108 or mobile communication device 144 may be provided whereas any preference that cannot be accommodated (e.g., because the device does not have appropriate hardware or software) will not be provided.

Figure 9:
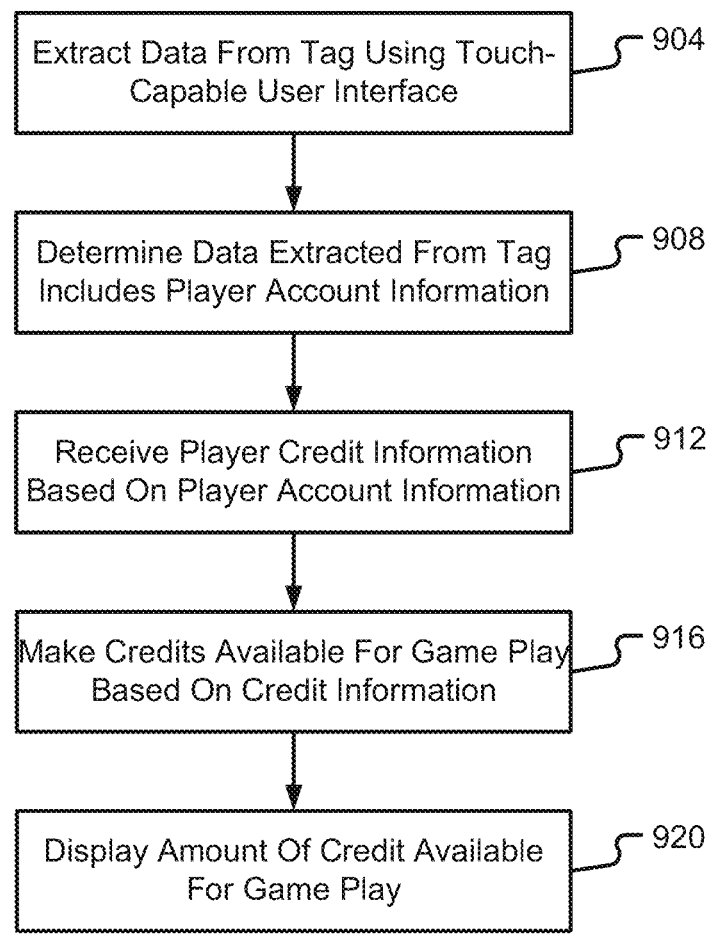
FIG. 9 is a flow diagram depicting a fifth method of enabling user interactions with a gaming device in accordance with embodiments of the present disclosure.

With reference now to FIG. 9, yet another method of enabling user interactions with a gaming device 108 or mobile communication device 144 will be described in accordance with at least some embodiments of the present disclosure. The method begins by extracting data from a tag 156 using a touch-capable user interface 256 (step 904). The extracted data is then determined to be associated with a player account in the player profile database 148 (step 908). In some embodiments, the determination that extracted data from a tag 156 is associated with a player account can be performed at the server 116 by referencing the information from the tag database 152 with information at the player profile database 148. In some embodiments, the tag ID may be extracted from the tag 156 and the tag ID may be stored in association with a player profile maintained at the player profile database 148. In some embodiments, a field in the tag database 152 having the tag ID maintained therein may have a pointer or data reference to the player profile maintained in the player profile database 148.

When it is determined that the extracted data is associated with a player account, the method may continue with the server 116 providing the gaming device 108 or mobile communication device 144 with player credit information that is determined based on the information contained in the player profile database 148 (step 912). In some embodiments, the tag ID may be used to determine that the player has a player account and the player account may indicate an amount of available wager credit that can be used at the gaming device 108 or mobile communication device 144 during game play. Upon receiving player credit information from the server 116, the gaming device 108 or mobile communication device 144 may update the credit meter 224 to make the credits available to the player 112 during gameplay (step 916). Furthermore, the amount of available credit may be displayed to the player 112 via the touch-capable user interface 256 that was used to read that tag 156 and extract the data from the tag 156 (step 920).

Figure 10:
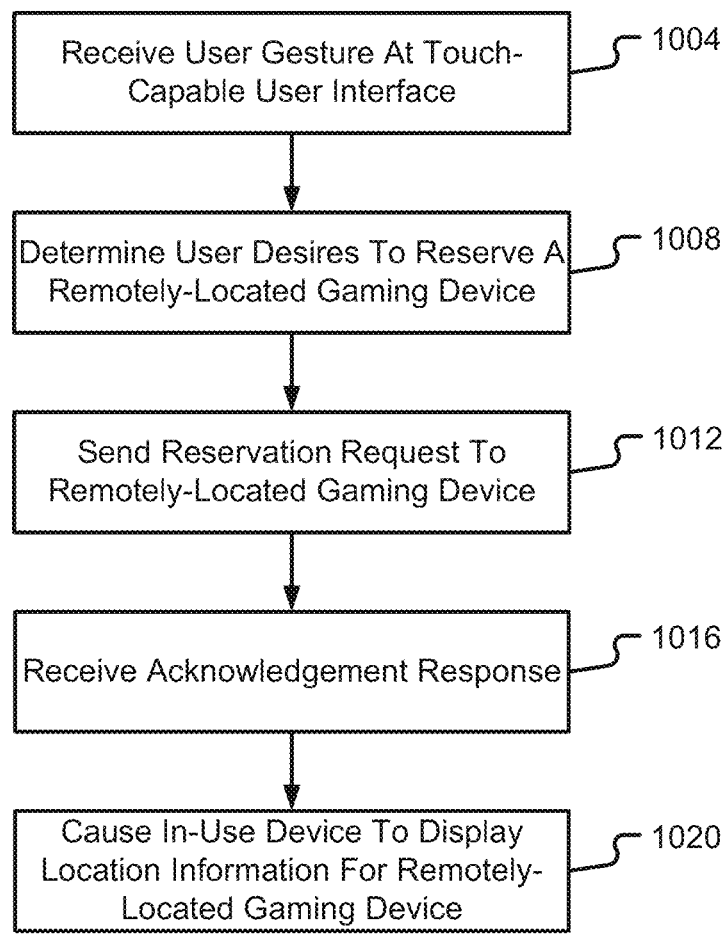
FIG. 10 is a flow diagram depicting a sixth method of enabling user interactions with a gaming device in accordance with embodiments of the present disclosure.

With reference now to FIG. 10, another method of enabling user interactions with a gaming device 108 or mobile communication device 144 will be described in accordance with at least some embodiments of the present disclosure. The method begins by receiving a gesture 420 at a touch-capable user interface 256 (step 1004). The method then continues by determining that the player 112 desires to reserve a remotely-located gaming device 108 (step 1008). In some embodiments, the determination of step 1008 is based on the gesture received in step 1008. Alternatively or additionally, data contained on a tag 156 read at touch-capable user interface 256 used in combination with the gesture may provide the indication that the player 112 desires to reserve a remotely-located gaming device 108.

In some embodiments, the reservation of a remotely-located gaming device 108 may be dependent upon the player 112 carrying an activated tag 156 and may further depend upon the tag 156 enabling a reservation feature when data is read from the tag 156. If such a condition is required to reserve a gaming device 108 and the player 112 does not have a tag 156 that enables such a feature, then the player 112 may not be allowed to reserve a gaming device 108; however, if the player 112 is carrying such a tag 156, then the player 112 may be allowed to continue with the reservation.

The method will then continue with the gaming device 108 at which the player 112 is currently located sending a reservation request to the remotely-located gaming device (step 1012). In some embodiments, the reservation request may include data extracted from a tag 156 at the touch-capable user interface 256 (e.g., a tag ID of the tag 156). The method will then continue with the player 112 waiting for a receipt acknowledgement response (step 1016). Upon receiving the acknowledgement that the remotely-located gaming device 108 is reserved, then the player 112 is allowed to walk to the remotely-located gaming device 108 and begin gameplay at the remotely-located gaming device 108 by presenting the same tag 156 used at the previous gaming device 108 and by providing an appropriate gesture in combination with presenting the tag 156 to the gaming device 108. In some embodiments, it may be desirable to present the player 112 with directions to the remotely-located gaming device 108 via the touch-capable user interface 256 of the in-use device 108 (step 1020). Presentation of the tag 156 to the remotely-located gaming device 108 enables the device 108 to detect that the player 112 has arrived and that the player 112 is indeed the same player 112 that submitted the reservation request at the previous gaming device 108 (e.g., based on the recognition of the tag 156 that was used to make the reservation).

Figure 11:
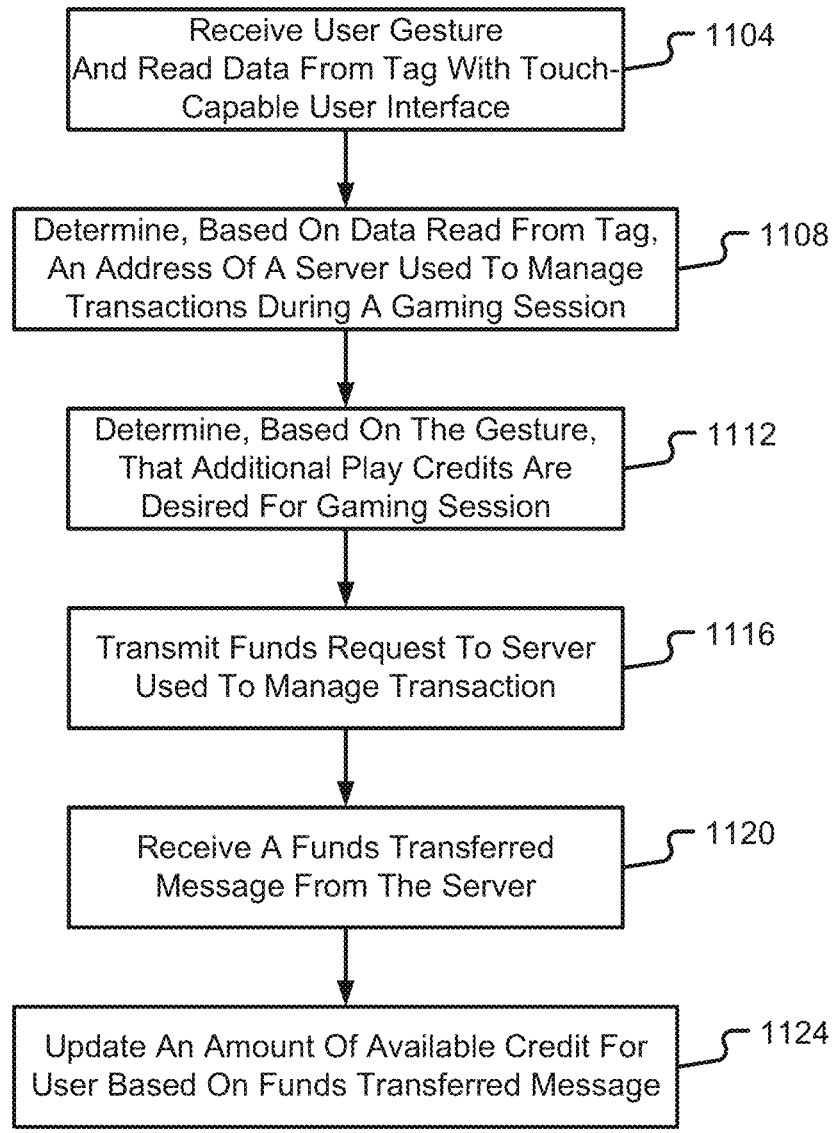
FIG. 11 is a flow diagram depicting a seventh method of enabling user interactions with a gaming device in accordance with embodiments of the present disclosure.

With reference now to FIG. 11, another method of enabling user interactions with a gaming device 108 or mobile communication device 144 will be described in accordance with embodiments of the present disclosure. The method begins by receiving a gesture 420 and by reading data from a tag 156 at a touch-capable user interface 256 (step 1104). The method then continues by determining that the player 112 that provided the gesture 420 and that presented the tag 156 to the gaming device 108 or mobile communication device 144 desires to extract funds from an account to enable game play at the gaming device 108 or mobile communication device 144 (step 1112). Before, after, or simultaneous with determining that the player 112 desires to receive funds for further game play, the method may also include determining, based on the data read from the tag 156, an address of a server 116 used to manage transactions during a gaming session is determined (step 1108). Alternatively or additionally, an address of a server used by a financial institution to manage an account of the player 112 may correspond to the server identified in step 1108. This server determination may be based on data extracted from the tag 156 or based on an association of the tag ID with a server 116 address that contains the game management instruction set 140.

Following steps 1108 and 1112, the method continues with the gaming device 108 or mobile communication device 144 transmitting a funds request message to the server 116 identified in step 1108 (step 1116). The server 116 may then perform appropriate lookup processes and communicate with other financial institutions to determine if the player 112 has sufficient funds to move from a personal account into a gaming account that is accessible to the game management instruction set 140.

If funds are available to the player 112 and the financial institution is capable of transferring funds to the gaming account of the player (e.g., to the server 116 for use by the player 112), then the method continues when a funds transferred message is received from the server that manages the fund transfer (step 1120). The server 116 at which the game management instruction set 140 is provided may then update an amount of available credits that can be used by the player 112 (step 1124). The available credits may be updated based on the amount of funds transferred from the financial institution. This information may be presented to the player 112 via the gaming device 108 or mobile communication device 144.

Figure 12:
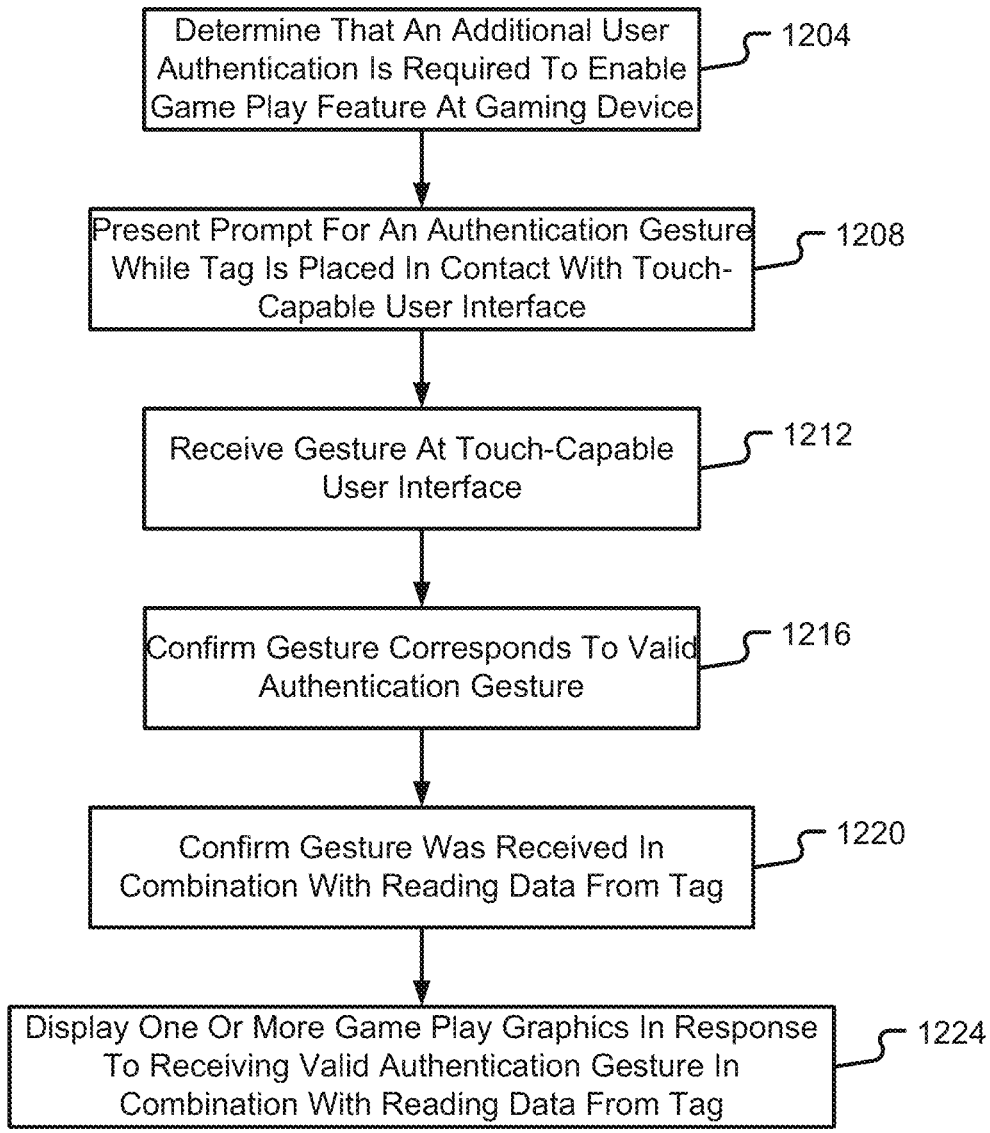
FIG. 12 is a flow diagram depicting an eighth method of enabling user interactions with a gaming device in accordance with embodiments of the present disclosure.

With reference now to FIG. 12, still another method of enabling user interactions with a gaming device 108 or mobile communication device 144 will be described in accordance with at least some embodiments of the present disclosure. The method begins when a tag 156 is presented to a gaming device 108 or mobile communication device 144 and it is determined that an additional user authentication is required to enable a game play feature that would otherwise be provided to the player 112 at the gaming device 108 or mobile communication device 144 based on the presentation of the tag 156 (step 1204).

In response to determining that additional authentication is required, the method continues by presenting the player 112 with a prompt for an authentication gesture and further indicating that the prompt needs to be provided while the tag 156 is being presented at the touch-capable user interface 256 (step 1208). In some embodiments, the prompt is also presented via the touch-capable user interface 256 and a portion 404 of the touch-capable user interface 256 is highlighted for the player 112 as to where the tag 156 and/or gesture 420 should be provided.

The method continues with the player 112 providing the gesture 420 at the touch-capable user interface 256 (step 1212). The gesture is then analyzed by the gesture recognition instruction set 232 to determine whether or not the gesture 420 corresponds to a valid authentication gesture and to confirm that the gesture 420 was provided at an appropriate portion 404 of the touch-capable user interface 256 (step 1216). The gesture recognition instruction set 232 and tag interaction instruction set 236 may then cooperate to determine and confirm that the gesture 420 was received in combination with the tag 156 being presented to the touch-capable user interface 256 (step 1220). In some embodiments, the gesture 420 may be required to be received and read at substantially the same time and in substantially the same location of the touch-capable user interface 256.

In response to confirming the valid authentication gesture was received in combination with reading data from the tag 156, the method continues by enabling the gaming device 108 or mobile communication device 144 to display one or more gaming graphics to the player 112 (step 1224). In some embodiments, the graphics presented to the player 112 may include an example of the graphics illustrated in FIG. 4J.

Figure 13:
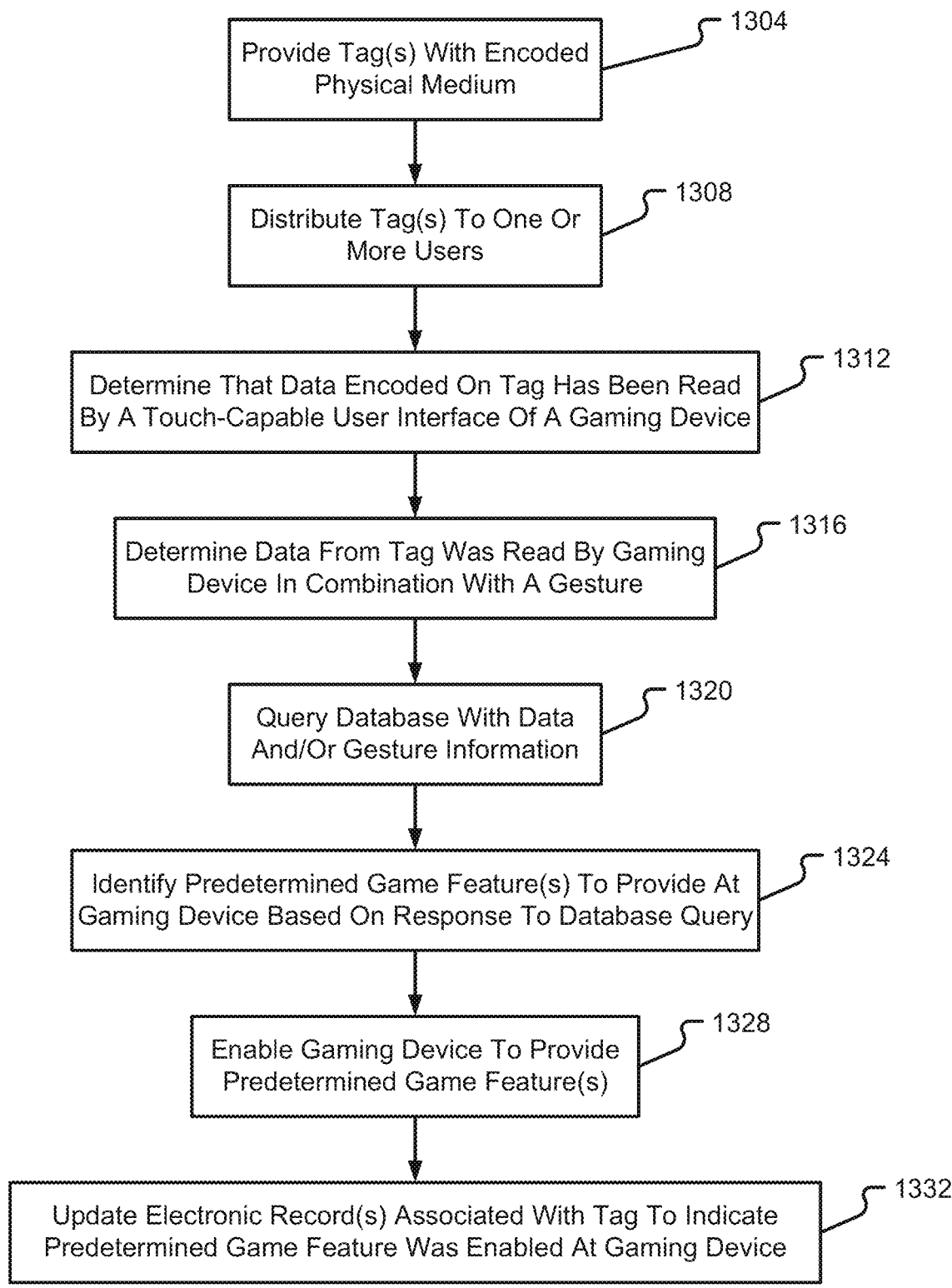
FIG. 13 is a flow diagram depicting a ninth method of enabling user interactions with a gaming device in accordance with embodiments of the present disclosure.

With reference now to FIG. 13, another method of enabling user interactions with a gaming device 108 or mobile communication device 144 will be described in accordance with embodiments of the present disclosure. The method begins by providing a population of tags 160 with an encoded physical medium thereon (step 1304). As discussed in detail herein, the encoded physical medium provided on each tag in the population of tags 160 may include conductive, coded ink that is printed on the tags 160.

The method continues by distributing the population of tags 160 to one or more players 112 in a gaming system 100 (step 1308). Thereafter, the method will wait until it is determined that data encoded on a particular tag 156 from the population of tags 160 has been read by a touch-capable user interface 256 of a gaming device 108 or mobile communication device 144 (step 1312). This causes the code validation instruction set 132 to further determine that the data was read from the tag in combination with a player 112 providing a predetermined gesture to the gaming device 108 or mobile communication device 144 (step 1316). The code validation instruction set 132 will then utilize the data and the gesture information to generate a database query for querying the tag database 152 (step 1320).

In some embodiments, the code validation instruction set 132 may query the tag database 152 to determine whether the tag 156 is allowed to be activated, whether the tag 156 is already activated, and/or whether the tag 156 has any game features that are eligible for activation at the gaming device 108 and/or mobile communication device 144. Based on the response received from the tag database 152, the code validation instruction set 132 may identify one or more game features that can be provided to the player 112 at the gaming device 108 and/or mobile communication device 144 (step 1324). In some embodiments, the game feature that is identified in step 1324 may be identified based upon the data read from the tag 156, based upon the gesture provided by the player 112, based upon the device that read the tag 156, based upon a time at which the tag 156 was read, or combinations thereof.

Following the identification of the predetermined game feature(s), the method continues by enabling the gaming device 108 and/or mobile communication device 144 to provide the identified predetermined gaming feature(s) to the player 112 (step 1328). Thereafter, the code validation instruction set 132, player profile management instruction set 136, and/or game management instruction set 140 may update one or more electronic records associated with the tag 156 to indicate that the predetermined game feature was enabled and/or provided to the player 112 via the gaming device 108 or mobile communication device 144 (step 1332). In some embodiments, the electronic record updated in this step may correspond one or more fields of the data structure 164 maintained in the tag database 152. Alternatively or additionally, the electronic record updated in this step may correspond to a data field maintained in memory 124 of the server 116, in memory 208 of a gaming device 108, and/or in memory 308 of a mobile communication device 144.

Figure 14:
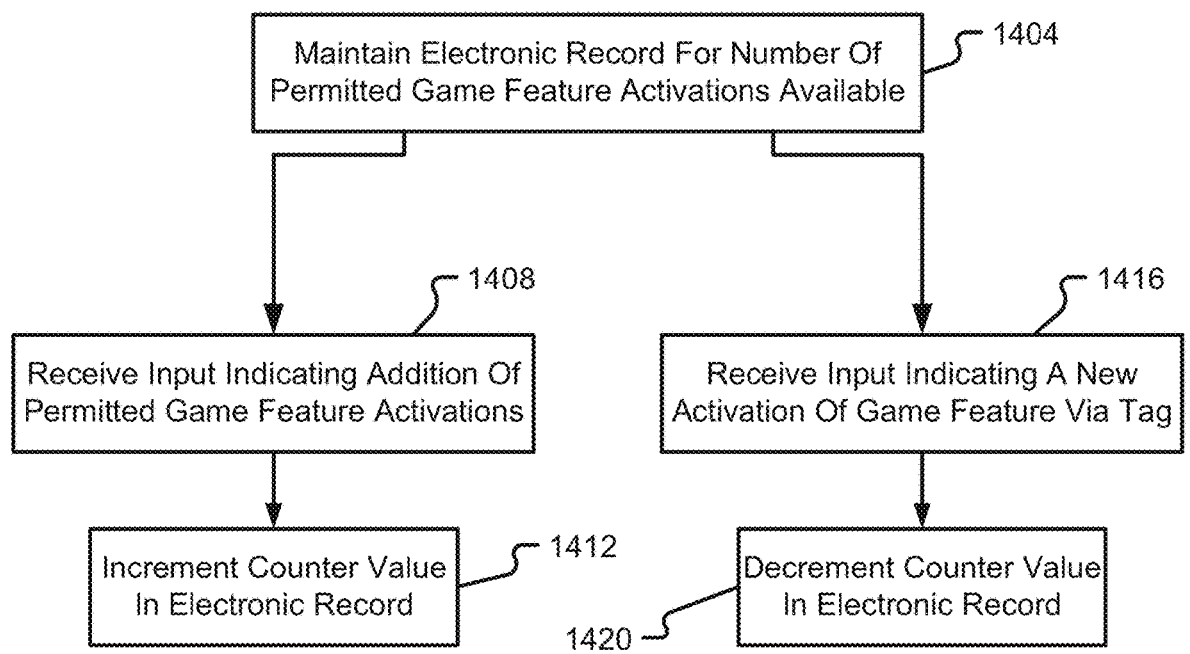
FIG. 14 is a flow diagram depicting a tenth method of enabling user interactions with a gaming device in accordance with embodiments of the present disclosure.

With reference now to FIG. 14, still another method of enabling user interactions with a gaming device 108 or mobile communication device 144 will be described in accordance with embodiments of the present disclosure. The method begins by maintaining one or more electronic records for a number of permitted game feature activations that are available for a particular tag 156 or for a population of tags 156 (step 1404). In some embodiments, the electronic record(s) used to maintain this information may include the data structure 164 and, in particular, the remaining feature(s) field 180 and/or the activation rule(s) field 184.

The method may then proceed in one of two different paths. In some embodiments, the method may proceed when an input is received at a gaming device 108 or mobile communication device 144 indicating an addition of permitted game feature activations (step 1408). In some embodiments, the indication may also be communicated to the server 116 via the device that received the initial input from the player 112. The input, in some embodiments, may correspond to a player 112 input that indicates a desire to purchase additional game feature activations. In some embodiments, the input may include an indication that the player 112 has earned a bonus opportunity during game play at a gaming device 108 or mobile communication device 144. The method may then continue by incrementing a counter value in the electronic record to indicate the addition of more available game feature activations (step 1412). For instance, a counter value maintained in the remaining feature(s) field 180 may be incremented in accordance with the number of additional activations identified in step 1408.

Referring back to step 1404, if an input is received indicating that a game feature has been activated (step 1416), then the counter value in the electronic record may be decremented appropriated (step 1420). In some embodiments, each activation of a game feature through use of the tag 156 may cause the counter value to decrement by one. In some embodiments, multiple activations of the game feature may cause the counter value to decrement by one. As can be appreciated, the method of FIG. 14 may be repeated as necessary and the counter value associated with remaining feature activations may be incremented and decremented as necessary based on usage of the tag 156 by the player 112 or by multiple players 112.

Figure 15:
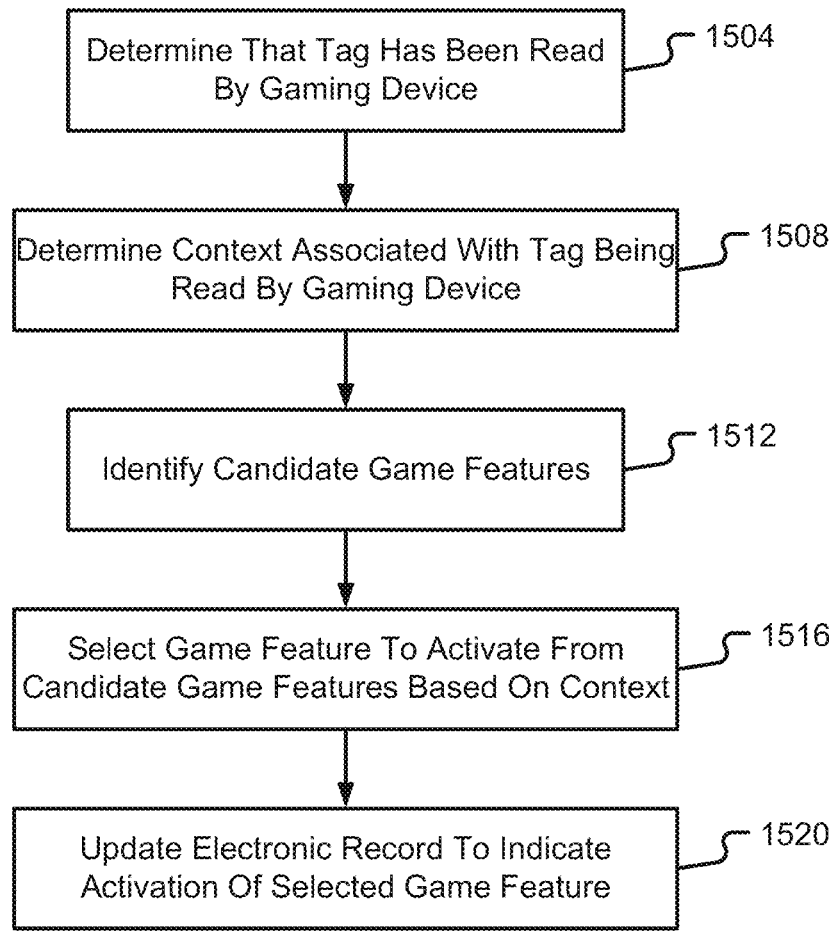
FIG. 15 is a flow diagram depicting an eleventh method of enabling user interactions with a gaming device in accordance with embodiments of the present disclosure.

With reference now to FIG. 15, another method of enabling user interactions with a gaming device 108 or mobile communication device 144 will be described in accordance with embodiments of the present disclosure. The method begins by determining that a tag 156 has been read by a gaming device 108 or mobile communication device 144 (step 1504). The determination may be made at the server 116 via one or more of the instruction sets stored in memory 124 or at a local instruction set being executed at the gaming device 108 or mobile communication device 144.

The method continues by determining a context associated with the tag 156 being read by the gaming device 108 or mobile communication device 144 (step 1508). In some embodiments, a context of the tag 156 read event may include a time of day at which the tag 156 was read, a device identified that was used to read the tag 156, a location of the tag 156 and/or device used to read the tag 156, a player loyalty account that is associated with the tag 156, whether the tag is being used anonymously by the player 112, whether the tag 156 is being used in connection with a gaming tournament, a game currently being played when the tag 156 was read by the device, or combinations thereof.

Other non-limiting examples of a context may include activation based on orientation, game experience, remaining credits, wager settings, timing, and/or swiping speed. A game situation-based context may be where activating the tag 156 in a base game might trigger another action in the base game or other game still in session. A game experience-based context may be where the tag 156 triggers different actions based on activation history of the tag 156. A remaining credit-based context may be where the tag 156 will detect there are little or no credits and will offer Free Spins. Another example of a credit-based context is where the tag 156 receives above a credit threshold and offers in-game bonuses or other rewards. A timing-based context may be where some tags 156 may be activated prior to a reel spin to modify the potential outcome after the reels have stopped. Another example of a timing-based context is where some tags 156 might be activated when the reels already stand still to change the outcome even afterward. A swiping speed-based context may be where the outcome of the game might depend on a player's 112 swiping speed, whether the player 112 swipes quickly or slowly. Furthermore, any combination of these non-limiting contexts can be used to determine outcomes, give rewards, or vary odds.

Based on the determined context, the method may then continue by identifying the candidate game features that are available to the player 112 (step 1512). The candidate game features may be presented to the player 112 via the gaming device 108 or mobile device 144 for selection by the player 112 (step 1516). The method will then continue by enabling the selected game feature and then updating an appropriate electronic record to indicate the activation of the selected game feature (step 1520).

Figure 16:
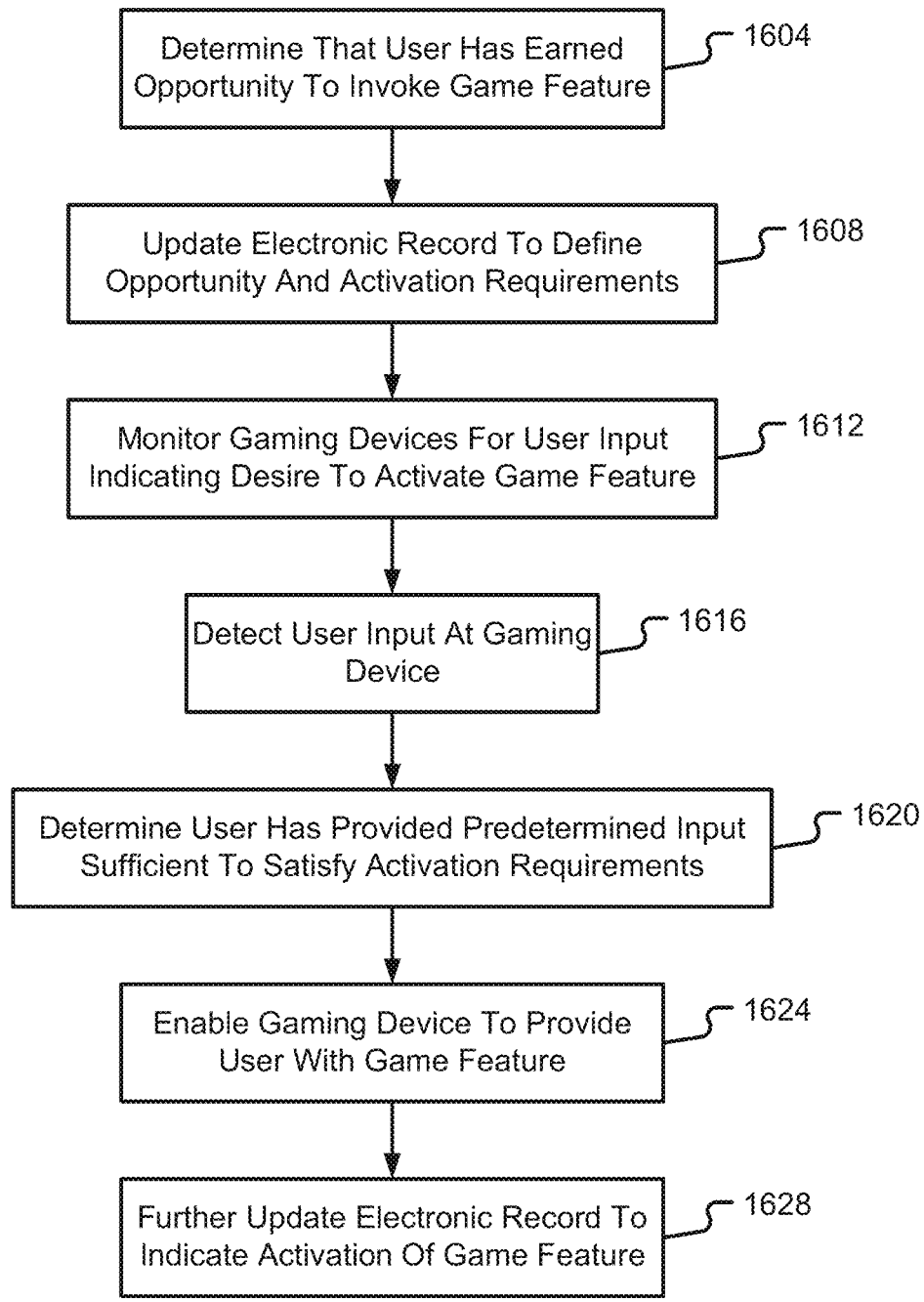
FIG. 16 is a flow diagram depicting a twelfth method of enabling user interactions with a gaming device in accordance with embodiments of the present disclosure.

With reference now to FIG. 16, another method of enabling user interactions with a gaming device 108 or mobile communication device 144 will be described in accordance with embodiments of the present disclosure. The method begins by determining that a player 112 has earned an opportunity to invoke a game feature (step 1604). An appropriate electronic record may be updated to indicate that the player 112 has earned the opportunity to invoke the game feature and the electronic record may be further updated to indicate activation requirements associated with activation of the game feature (step 1608). In some embodiments, this may include updating the activation rule(s) field 184 and/or remaining feature(s) field 180 of the data structure 164.

The method will then continue by monitoring gaming device 108 and/or mobile communication devices 144 for an input indicating the player's 112 desire to activate the game feature (step 1612). It should be appreciated that the monitoring may occur across multiple gaming devices 108 or mobile communication devices 144 or the activation rules may require the activation to occur at a particular device, in which case the monitoring may occur with respect to the particular device and not other devices. In some embodiments, it may be an activation requirement that the player 112 activate the game feature at a different device from the device at which the opportunity was earned. In other words, the player 112 may be required to move to a different type of device to activate a particular game feature that was earned at an initial device. In other embodiments, the activation rules may require that the game feature be activated at the same device at which the game feature was earned by the player 112.

The method will then continue when an input is detected at a gaming device 108 or mobile communication device 144 indicating a desire to activate the previously-earned game feature (step 1616). This will then cause the game management instruction set 140 to determine whether or not the player 112 has provided the appropriate predetermined input that is sufficient to satisfy the activation requirements of the game feature (step 1620). In some embodiments, the appropriate predetermined input may correspond to a pre-determined gesture to be provided in combination with presenting the tag 156 to the touch-capable user interface 256. In some embodiments, the appropriate predetermined input may correspond to presenting the tag 156 to the device at a permissible time, within a particular area of the touch-capable user interface 256, and/or by providing an appropriate gesture relative to the tag 156.

After it is determined that the player 112 has provided the appropriate input, the method may continue by enabling the gaming device 108 or mobile communication device 144 to provide the previously-earned game feature to the player 112 (step 1624). The method may also include updating an appropriate electronic record to indicate that the game feature was enabled and provided to the player 112 (step 1628).

Figure 17:
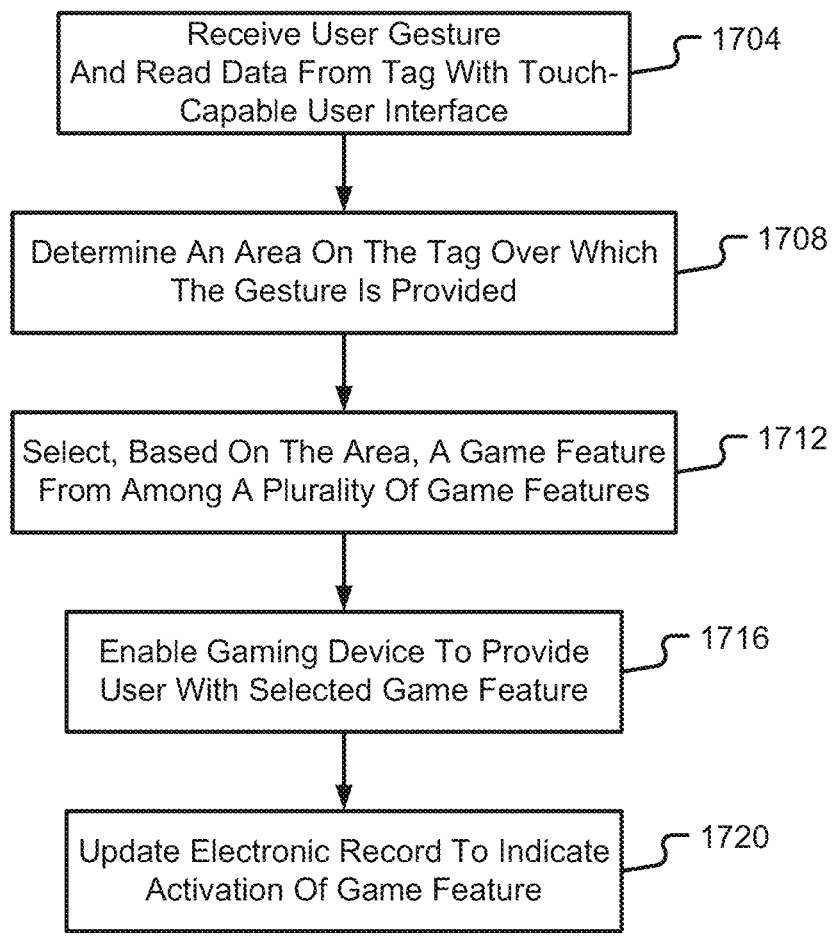
FIG. 17 is a flow diagram depicting a thirteenth method of enabling user interactions with a gaming device in accordance with embodiments of the present disclosure.

With reference now to FIG. 17, another method of enabling user interactions with a gaming device 108 or mobile communication device 144 will be described in accordance with embodiments of the present disclosure. The method begins by receiving a player's 112 gesture input in combination with a presentation of a tag 156 at a touch-capable user interface 256 (step 1704). During the presentation of the tag 156 and during receipt of the gesture, the method may continue by determining an area on the tag 156 over which the gesture is provided (step 1708). The area over which the gesture is provided may be used to select a particular game feature from among a plurality of game features for activation (step 1712). For instance, a gesture provided over one area of a tag 156 may result in activation of a first game feature whereas a gesture provided over a different area of a tag 156 may result in activation of a second, different, game feature. This may occur because the position of the gesture relative to the tag 156 is different and registered with the touch-capable user interface 256 and/or because a gesture over one area of the tag 156 causes one set of data to be read at the touch-capable user interface 256 whereas a gesture over a different area of the tag 156 causes a different set of data to be read at the touch-capable user interface 256.

The method then continues by enabling the gaming device 108 or mobile communication device 144 to provide the selected game feature to the player 112 (step 1716). The method may also include updating an electronic record to reflect that the selected game feature was activated (step 1720). In some embodiments, the electronic record may also be updated with information describing the area of the tag 156 over which the gesture was provided and/or the data read from the tag 156 as a result of the gesture being provided over the particular area of the tag 156.

Figure 18:
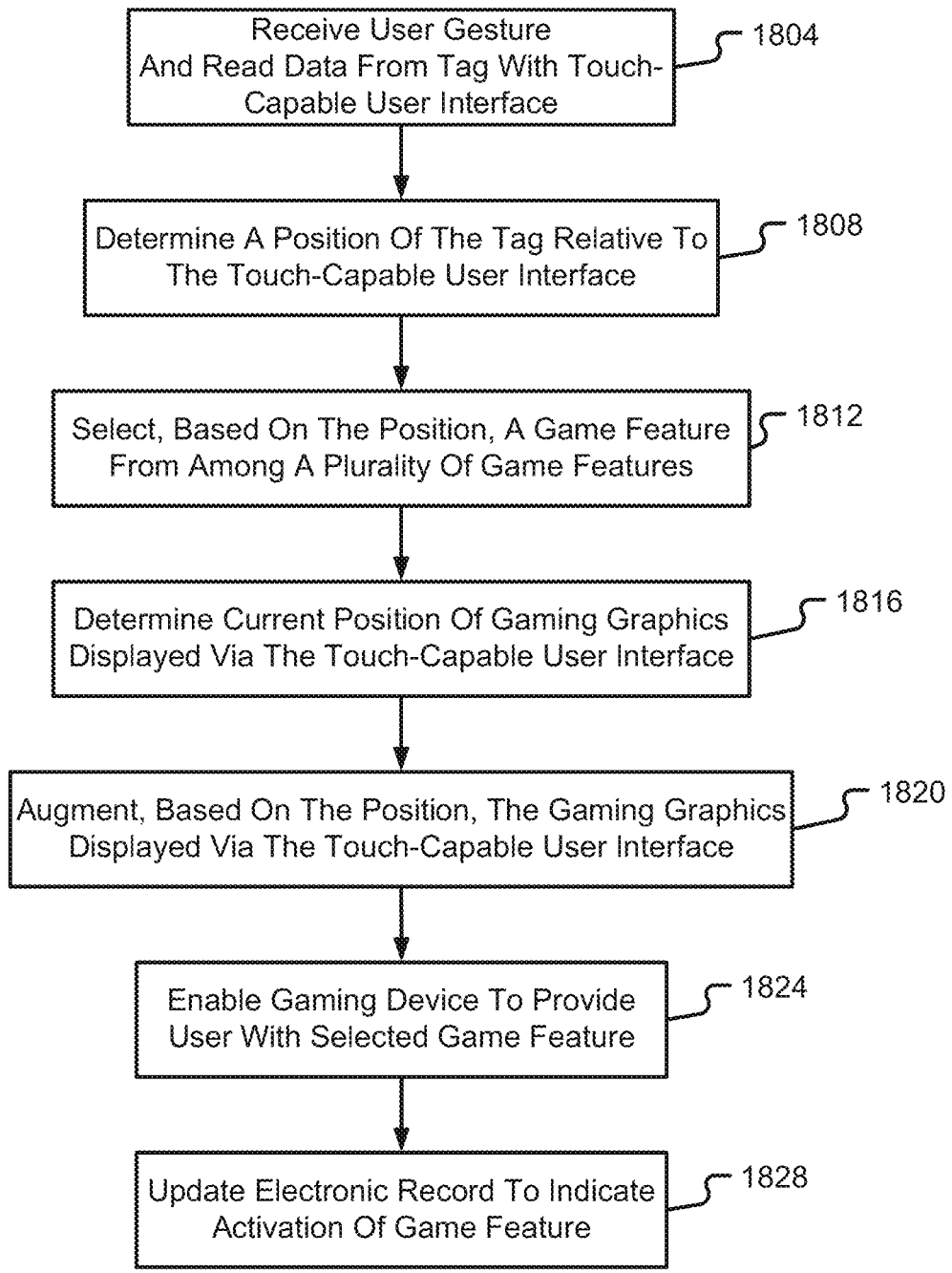
FIG. 18 is a flow diagram depicting a fourteenth method of enabling user interactions with a gaming device in accordance with embodiments of the present disclosure.

With reference now to FIG. 18, still another method of enabling user interactions with a gaming device 108 or mobile communication device 144 will be described in accordance with embodiments of the present disclosure. The method begins by receiving a player's 112 gesture input in combination with a presentation of a tag 156 at a touch-capable user interface 256 (step 1804). During or after this step, the method may also include determining a position of the tag 156 relative to the touch-capable user interface 256 (step 1808). Based on the determined position of the tag 156 relative to the touch-capable user interface 256, a particular game feature may be selected from among a plurality of game features (step 1812). This selection may occur automatically by the game management instruction set 140 or by game instructions 220 executed by the gaming device 108 or mobile communication device 144. The game feature selected in this step may also depend upon the orientation of the tag 156 and the direction of the gesture provided relative to the position/orientation of the tag 156.

The method may then continue by determining a current position of gaming graphics displayed via the touch-capable user interface 256 (step 1816). In some embodiments, the tag 156 may be positioned in an overlapping relationship with respect to at least some of the gaming graphics. In some embodiments, the tag 156 may be positioned adjacent to, but not overlapping with some of the gaming graphics displayed by the touch-capable user interface 256.

Based on the position of the tag 156 relative to the gaming graphics, the method may continue by augmenting some of the gaming graphics presented via the touch-capable user interface 256 (step 1820). In some embodiments, gaming graphics may be augmented to be displayed around or to enhance a presentation of the tag 156 while pressed against the touch-capable user interface 256. In some embodiments, gaming graphics may be augmented to move from behind the position of the tag 156, thereby making the gaming graphics visible while the tag 156 is pressed against the touch-capable user interface 256. In some embodiments, the tag 156 may be provided with one or more view windows or openings and the gaming graphics may be augmented to present at least some graphics through the view window or opening of the tag 156. Other augmentations of the gaming graphics are also possible without departing from the scope of the present disclosure.

The method may then continue by enabling the gaming device 108 or mobile communication device 144 to provide the player 112 with the selected game feature (step 1824). The method may further include updating an associated electronic record to indicate the activation of the game feature (step 1828). In some embodiments, the electronic record may also be updated to include information describing how the gaming graphics were augmented in response to activation of the tag 156.

Figure 19:
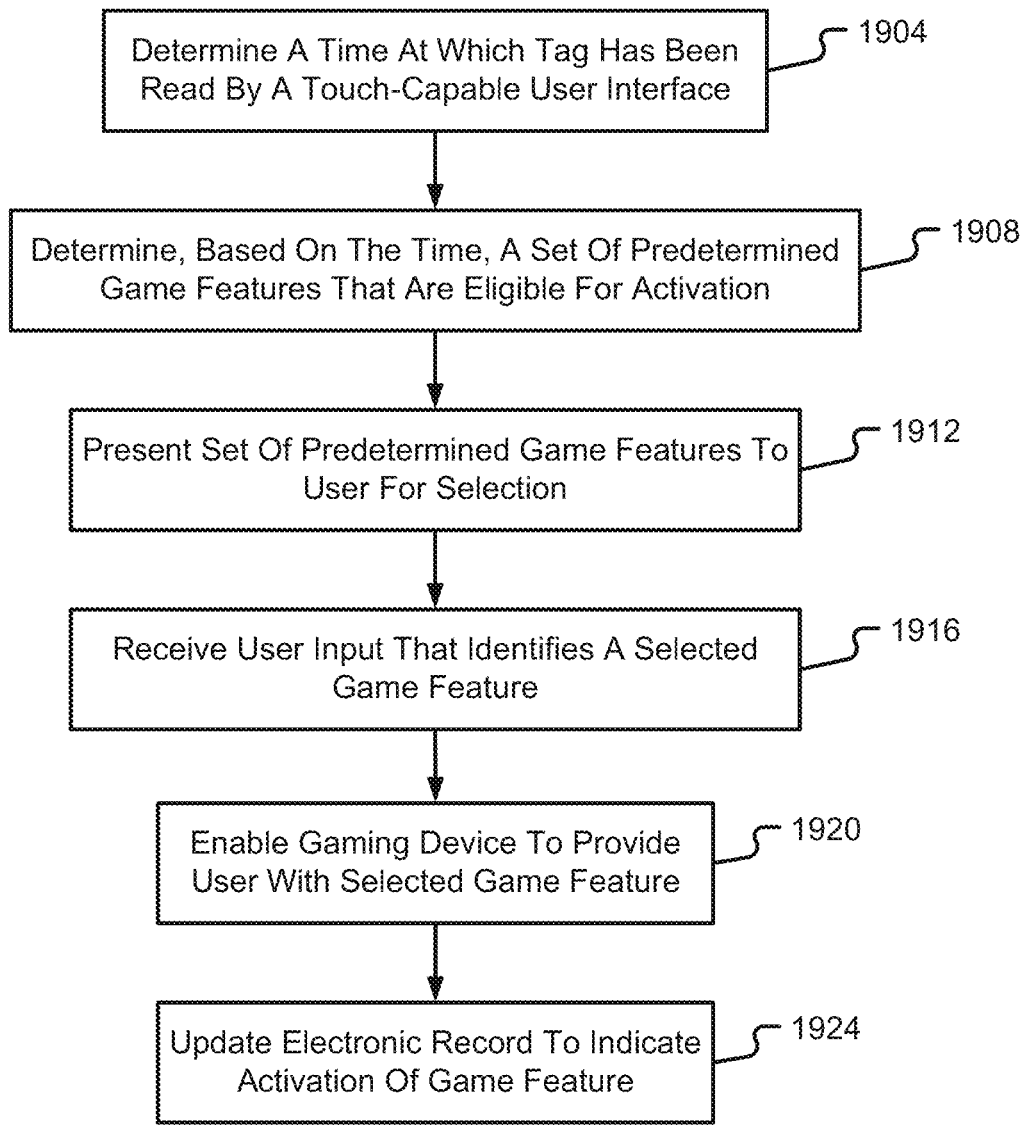
FIG. 19 is a flow diagram depicting a fifteenth method of enabling user interactions with a gaming device in accordance with embodiments of the present disclosure.

With reference now to FIG. 19, another method of enabling user interactions with a gaming device 108 or mobile communication device 144 will be described in accordance with embodiments of the present disclosure. The method begins by determining that a tag 156 has been read by a touch-capable user interface 256 and determining a time at which the tag 156 was read by the touch-capable user interface 256 (step 1904). This determination may be made locally (e.g., at the device having the touch-capable user interface 256) and/or at the server 116 that receives a timestamp associated with the tag 156 read event.

The method then continues by determining a set of game features that are eligible for activation (step 1908). In some embodiments, the eligible game features may be determined based on the time at which the tag 156 was read. The determination of eligible game features may be made by the server 116 with reference to the tag database 152 (e.g., by referencing the activation rule(s) field 184 or by querying for information from the data structure 164).

The method further continues by presenting the player 112 with the set of eligible game features for selection (step 1912). In some embodiments, the presentation of the eligible game features may be provided via the touch-capable user interface 256 that was used to read the tag 156. The player 112 may then respond or select a particular game feature from the set of eligible game features (step 1916). The player's 112 selection is then used to activate the selected game feature and enabling the gaming device 108 or mobile communication device 144 to provide the selected game feature (step 1920). The method may further include updating the electronic record to indicate the activation of the game feature (step 1924).

It should be appreciated that there are a large number of gaming use cases that can be enabled with a tag 156 having data encoded thereon that is readable by a touch-capable user interface 256. There are anonymous-related use cases (e.g., where the tag 156 enables anonymous gameplay), personalization-related use cases (e.g., where the tag ID of the tag 156 is linked or associated with a player account and player information), and cash transfer-related use cases.

Additional Examples

Regarding anonymous-related use cases, anonymous players 112 may be allowed to collect and store bonus points on the card which are redeemable in the casino's loyalty program. It may also be possible to have game progress saved to a tag and continue playing at some other time (e.g., at a next casino visit). A player 112 may also be allowed to skip game instructions/tutorials at games they've already played with that tag 156. Also, based on gambling experience, lock functionalities may be maintained in games until the anonymous player 112 has gained the required experience and proved that experience via presentation of the tag 156. Once an achievement is collected, it is associated to the player's tag. It may also be possible to save personal game settings to the tag 156 and have those settings be restored (e.g., skins, language, volume, bet, denomination, speed, etc.). The tag 156 can also be considered akin to having cash saved to tag. It may also be possible to consider multiple tag types with different value—players might pay for a "premium tag." A premium tag might enable additional settings, game options, features, etc. that might not be available for players 112 without any tag at all, or for players without the "premium tag." It may also be possible to enable an anonymous player 112 to collect bonus points and automatically upgrade to a premium experience once a spending threshold is reached. In some embodiments, the player 112 may be allowed to review game statistics of the current and/or previous game sessions (e.g., "account" statistics, sensitive cash statistics, etc.). As yet another example, when the casino calls out for casino tournament, the anonymous player 112 might register using the tag 156 activated at the gaming device 108 they are currently playing. Thus, the player 112 can finish their gaming session at the gaming device 108 and register for the tournament without the need to leave the gaming device 108 for the reservation. The reserved gaming device 108 at the tournament is locked until the tag ID of the tag 156 used by the player 112 is scanned.

Regarding personalization-related use cases, players 112 may be enabled to: have loyalty points saved in association with their tag 156; have game progress saved in association with the tag 156 and continue playing there at some other time (e.g. next casino visit); skip game instructions/tutorials at games they've already played; have personal game settings saved to tag 156 and restored (e.g., skins, language, volume, bet, denomination, speed, . . . ). The tag 156 can be used in the same way as having cash saved to card, (e.g., use as alternative to ticket-in, ticket-out). It may also be possible to consider multiple tag types with different value based on player's loyalty status (e.g. Standard user vs. VIP). The tag 156 could be encoded with data that contains or unlocks "standard functions" vs. "VIP functions", could collect loyalty points and auto upgrade once a spending threshold is reached. A "high roller" tag 156 could be used by a player 112 allowing their own mathematics activated by tag (e.g., to enable a gaming device 108 to provide better odds for premium customers). The tag 156 may also provide security/privacy functions available directly by pressing/sliding the tag 156 over specific areas on the tag 156 (e.g., causing different encoded physical media 408 to be read by the touch-capable user interface 256).

The tag 156 could also be used to implement a code terminal (e.g. digits 0-9, symbols to be pressed in a given order, dot-pattern like on mobile devices, etc.) directly on the tag and "unlock" tracking card where without the code, no other players can play features provided by the tag 156. Continuing the code example, the code could be used to activate/deactivate specific in-game functions (e.g., High Roller Mode). The tag 156 could also be used to personalize cash-out tickets related to the player tag—can only be redeemed with card/code. Such a code could enable "Digital Signature" for critical decisions, warnings, etc. The code may also be used to lock a gaming device 108 for a certain time by entering an unlock code. As discussed above, the tag 156 could also be used by the player 112 to register for and reserve a gaming device during a casino tournament.

Regarding cash transfer related use-cases, a tag 156 could be linked to player tracking cards or loyalty cards (e.g., to collect loyalty points, etc.). The tag 156 could also be the same as a player tracking card (e.g., one card for all). The tag 156 may also be used as a cash alternative to pay at the bar, the casino venue, the casino hotel, car park, etc. In a very specific but non-limiting example, the tag 156 may enable Cash-In, Cash-Out Gestures to be provided in combination with the tag 156. For instance, a left-to-right swipe may cause funds to be transferred from an account associated with the tag 156 to a gaming device 108 whereas a right-to-left swipe may cause funds to be transferred from the gaming device 108 to an account associated with the tag 156. As another example, in the context of purchasing food or drinks directly from a gaming device 108, the tag 156 could enable the player 112 to choose what they want, immediately pay by swiping, and then the casino knows from which gaming device 108 the order came, thereby facilitating a quick and efficient delivery of the drink to the appropriate gaming device 108.

The present disclosure contemplates a variety of different gaming systems and environments each having one or more of a plurality of different features, attributes, or characteristics. A "gaming system" or "gaming environment" as used herein refers to various configurations of: (a) one or more central servers, central controllers, or remote hosts; (b) one or more electronic gaming machines such as those located on a casino floor; and/or (c) one or more gaming devices, such as desktop computers, laptop computers, tablet computers or computing devices, personal digital assistants, mobile phones, and other mobile computing devices. Moreover, an Electronic Gaming Machine (EGM) as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more gaming devices in combination with one or more central servers, central controllers, or remote hosts; (c) one or more gaming devices in combination with one or more electronic gaming machines; (d) one or more gaming devices, one or more electronic gaming machines, and one or more central servers, central controllers, or remote hosts in combination with one another; (e) a single electronic gaming machine; (f) a plurality of electronic gaming machines in combination with one another; (g) a single gaming device; (h) a plurality of gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "gaming device" as used herein represents one gaming device or a plurality of gaming devices and, in some embodiments, may include an EGM or multiple EGMs. The use of "server, central server, central controller, or remote host" as used herein represents one central server, central controller, or remote host or a plurality of central servers, central controllers, or remote hosts.

As noted above, in various embodiments, the gaming system includes an EGM (or gaming device) in combination with a central server, central controller, or remote host. In such embodiments, the EGM (or gaming device) is configured to communicate with the central server, central controller, or remote host through a data network or remote communication link. In certain such embodiments, the EGM (or gaming device) is configured to communicate with another EGM (or gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or gaming device) in combination with a central server, central controller, or remote host, the central server, central controller, or remote host is any suitable computing device (such as a server) that includes at least one processor and at least one memory device or data storage device. As further described herein, the EGM (or gaming device) includes at least one EGM (or gaming device) processor configured to transmit and receive data or signals representing events, messages, commands, or any other suitable information between the EGM (or gaming device) and the central server, central controller, or remote host. The at least one processor of that EGM (or gaming device) is configured to execute the events, messages, or commands represented by such data or signals in conjunction with the operation of the EGM (or gaming device). Moreover, the at least one processor of the central server, central controller, or remote host is configured to transmit and receive data or signals representing events, messages, commands, or any other suitable information between the central server, central controller, or remote host and the EGM (or gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or gaming device). Further, one, more than one, or each of the functions of the at least one processor of the EGM (or gaming device) may be performed by the at least one processor of the central server, central controller, or remote host.

In certain such embodiments, computerized instructions for controlling any games (such as any primary or base games and/or any secondary or bonus games) displayed by the EGM (or gaming device) are executed by the central server, central controller, or remote host. In such "thin client" embodiments, the central server, central controller, or remote host remotely controls any games (or other suitable interfaces) displayed by the EGM (or gaming device), and the EGM (or gaming device) is utilized to display such games (or suitable interfaces) and to receive one or more inputs or commands. In other such embodiments, computerized instructions for controlling any games displayed by the EGM (or gaming device) are communicated from the central server, central controller, or remote host to the EGM (or gaming device) and are stored in at least one memory device of the EGM (or gaming device). In such "thick client" embodiments, the at least one processor of the EGM (or gaming device) executes the computerized instructions to control any games (or other suitable interfaces) displayed by the EGM (or gaming device).

In various embodiments in which the gaming system includes a plurality of EGMs (or gaming devices), one or more of the EGMs (or gaming devices) are thin client EGMs (or gaming devices) and one or more of the EGMs (or gaming devices) are thick client EGMs (or gaming devices). In other embodiments in which the gaming system includes one or more EGMs (or gaming devices), certain functions of one or more of the EGMs (or gaming devices) are implemented in a thin client environment, and certain other functions of one or more of the EGMs (or gaming devices) are implemented in a thick client environment. In one such embodiment in which the gaming system includes an EGM (or gaming device) and a central server, central controller, or remote host, computerized instructions for controlling any primary or base games displayed by the EGM (or gaming device) are communicated from the central server, central controller, or remote host to the EGM (or gaming device) in a thick client configuration, and computerized instructions for controlling any secondary or bonus games or other functions displayed by the EGM (or gaming device) are executed by the central server, central controller, or remote host in a thin client configuration.

In certain embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include a local area network (LAN) in which the EGMs (or gaming devices) are located substantially proximate to one another and/or the central server, central controller, or remote host. In one example, the EGMs (or gaming devices) and the central server, central controller, or remote host are located in a gaming establishment or a portion of a gaming establishment.

In other embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include a wide area network (WAN) in which one or more of the EGMs (or gaming devices) are not necessarily located substantially proximate to another one of the EGMs (or gaming devices) and/or the central server, central controller, or remote host. For example, one or more of the EGMs (or gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or gaming devices) are located. In certain embodiments in which the communication network includes a WAN, the gaming system includes a central server, central controller, or remote host and an EGM (or gaming device) each located in a different gaming establishment in a same geographic area, such as a same city or a same state. Gaming systems in which the communication network includes a WAN are substantially identical to gaming systems in which the communication network includes a LAN, though the quantity of EGMs (or gaming devices) in such gaming systems may vary relative to one another.

In further embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include an internet (such as the Internet) or an intranet. In certain such embodiments, an Internet browser of the EGM (or gaming device) is usable to access an Internet game page from any location where an Internet connection is available. In one such embodiment, after the EGM (or gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or gaming device). Examples of implementations of Internet-based gaming are further described in U.S. Pat. No. 8,764,566, entitled "Internet Remote Game Server," and U.S. Pat. No. 8,147,334, entitled "Universal Game Server." The central server, central controller, or remote host and the EGM (or gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or gaming devices) to play games from an ever-increasing quantity of remote sites. Additionally, an enhanced bandwidth of digital wireless communications may render such technology suitable for some or all communications, particularly if such communications are encrypted. Higher data transmission speeds may be useful for enhancing the sophistication and response of the display and interaction with players.

It should also be appreciated that may different types of game features may be provided by the system 100 without departing from the scope of the present disclosure. Some game features may be provided in response to a tag 156 being read at a touch-capable user interface 256 whereas other game features may be provided in the absence of a tag 156 being presented to a gaming device 108 or mobile communication device 144. As a non-limiting example, one possible game feature includes a "One tag for multiple, selective activation options" where one tag 156 is made available to trigger different actions (e.g., activating option 1 triggers event A, option 2 triggers B, option 3 triggers C, etc.). In this scenario, it could be possible to have multiple activation paths to swipe along, or multiple touch points to be touched only or combinations thereof. In some embodiments, not all activation options might be available at the same time. For instance, tag 156 could have a separate activation counter for each option (e.g. option 1: 5 activations left; option 2: 3 activations left; option 3: no activations left). As another example, it could be possible to limit some of the available activation options on the tag 156, based on current game situation (some only available in base game, some only available in bonus feature, etc.).

As another game feature scenario that is contemplated by the present disclosure, it may be possible to provide a feature where multiple tags 156 are provided for multiple, pre-defined activation options. In this scenario, there might be a game situation in which the player 112 might want to decide which tag 156 to activate. Tag A might trigger option 1, whereas tag B might trigger option 2—the player 112 chooses which tag 112 & option they prefer in the current game situation. It may also be possible to consider using these tags 156 in a sequence (e.g., using tag A first and tag B second might lead to another game situation than using tag B first and tag A second).

Yet another game feature may correspond to an extra pick in feature. In this example, by using a tag 156 a player 112 may be allowed to extend the number of available in-game pick options in a pick feature (e.g., Pick feature with 3 options, by having a tag activated, a 4th option becomes available).

Yet another game feature may correspond to a swipe to undo function. In this example, a player 112 can activate a particular undo action with a tag 156 or gesture. For instance, a previously made decision or pick might be unmade, and a new selection might be made instead (the tag 156 may contain a given number of times the undo action is made available). Alternatively, a tag 156 may be configured collect activations in game. In this scenario, during a gaming session, the player 112 might be able to collect or earn additional activations of the tag 156.

Still another game feature that can be made available with a tag 156 is a player competition with multiple tags. In a tournament-like game setting, players 112 might use multiple of their activation tags 156 in certain game situations through which they gain advantages over the other players. The players might be able to use one tag 156 during the whole competition, in a situation they prefer; or multiple times, based on the number of activations left on the tag 156; or after every X minutes; etc.

Another game feature that may be enabled with a tag 156 includes a feature of augmenting digital information based on physical information provided by the tag. It is contemplated to enable augmentations of gaming graphics based on a number of factors such as: the type of the tag 156; the shape of the tag 156; tag data; etc. so that the digital augmentation looks like an "extension" of the tag 156. As another example, it may be possible have remarkable shapes of the tag 156 which augment the tag 156 well so that it is recognizable that the tag 156 and the game content are synched with each other. As another example, the tag 156 may have notches or holes cut into the tag 156 to augment themed information in the hole (e.g., counter of remaining activations). As another example, it may be possible to use tags constructed of different materials, such as non-transparent, semi-transparent or transparent materials and combine them to increase the variety of design elements (e.g., a tag 156 including paper combined with acrylic glass, whereas ink is printed on the paper and the glass is transparent to show digitally augmented content underneath). Still another possible augmentation is an augmentation where graphics are visualized during a gesture. In this visualize during a swipe game feature, as a player 112 swipes over the tag 156 or touches certain touch points on the tag 156, visualizations appear indicating the swipe gesture. The visualization might be synchronous to the swiping finger's current position in real time. It may also be possible to add sounds or other acoustical effects as the player 112 is swiping.

Possible use cases made possible by activation of a tag 156 are contemplated to include a multi-option selection where multiple areas on the tag 156 are used to make different selections, such as printed "buttons", symbols, swipe gestures whereas each triggers a certain action. For instance, a gamble feature may have all 4 card colors on the tag 156—while gambling, place tag 156 on display, and choose one color directly on the tag 156. If guessed correctly using the tag 156, player 112 gains extra credits. Alternatively or additionally, several different objects on tag 156 (circle, triangle, square) could provide different triggers depending on which object is selected. As another example, the tag 156 may enable a double-up feature where the tag 156 is provided with 2-way selection and the player 112 decides whether to swipe "top to bottom" or "bottom to top", different winnings depending on what player has chosen. It may also be possible to have a tag 156 enable a game feature such as a restricted function (e.g., a high roller mode of operation). Additionally, several different objects on tag 156 could be replaced, changed, and/or modify game content/rules on screen based on tag activation (e.g. in a video poker game). For instance, a player 112 may carry a physical "Ace" tag 156 that is configured to activate a card change event in a game if the player swipes their "Ace" tag 156 during game play. More specifically, a player 112 may be playing a video poker game and receive a set of cards during a card draw event. After the player 112 has been presented with their cards, the player 112 may present the "Ace" tag 156 to the touch-capable user interface 256 and provide a gesture in combination therewith. Upon providing the gesture, the "Ace" tag 156 may be read by the gaming device 108 and the player 112 may be allowed to change one of their cards with an "Ace" card. The activation of this content modification or game rule change may correspond to a one-time use or multiple uses, depending upon limitations placed on the "Ace" tag 156.

In some embodiments, a player 112 may be allowed to utilize the tag 156 as a carry-along bonus tag through the venue. In this situation, the tag 156 operates as a promotional card in casino or VLT venue. The player 112 can swipe on touch-capable user interface 256 or the tag 156 and get their bonus, pick a prize, have options to use the tag at various times during a game, etc.

As yet another example, the gaming device 108 and/or mobile communication device 144 may track swipe time and direction to enable more functionality. For instance, swipe time can be tracked and a skill game can be played based on the speed of the swipe (e.g., throw a ball into a basket (the faster the farther thrown)). Alternatively or additionally, settings may be adjusted based on swipe speed (e.g., adjust settings (the faster the greater the adjustments). There may also be multiple "paths" on the tag 156 to swipe along—based on which path is taken, different actions happen (e.g., Pseudo-skill or Skill feature: like Pokémon Go—"How do I throw the Pokeball?—analog paths printed on the card, ball is thrown differently based on path swiped along, etc.)

In some embodiments, the tag 156 may be used to invoke a game volatility feature. In this situation, activation of the tag 156 can increase/decrease game volatility (e.g., press arrow up or arrow down), and function is only available if the player 112 activates the volatility tag 156. Likewise, individual game mathematics may be activated by the tag 156 (e.g., "better math for premium customers").

Another illustrative game feature that can be activated with a tag 156 is an expanded pick feature. Without an appropriate tag 156, player 112 can select 1 out of 3 options, but with the appropriate tag: 4 options (e.g., more risky selection, selection with special effects, etc.) can be revealed to the player 112. In this scenario, the tag 156 may be used to present extra bonus options to the player 112.

Still another game feature is a swipe to rewind function. In a pick feature, with the tag 156 activated, the player 112 can pick one selection, see the outcome—and might be able to rewind their decision if they don't like the outcome. Then, the player 112 can select another option. This game feature could be like a bonus pick, saved on the tag 156. If the tag 156 has no bonus picks left, then the function is unavailable.

The tag 156 may also be presented to invoke a number of base game features. Examples of such features include, without limitation: Position a map on the middle roller and unlock/select additional pay lines; Conditional Wild to be placed on reel matrix—Position stays Wild for X games (based on Wilds collected, player could decide how long Wild shall stay); Position a Wild Stack on the game with tag 156 before Reel Spin (or after Reel Spin); and/or Position a personal multiplier at a certain position in the matrix—if there is a win, it's multiplied The tag 156 may further be used to activate themed-card bonuses. For instance, if the player 112 collects multiple different tags 156, then different tags 156 can be used to trigger something different within the game from a theme perspective. As an example, the player 112 may purchase a tag 156 with a ×2 cherry—activation of such a tag 156 can redeem it in a game with cherry—it counts double in case of win. As another example, tags 156 can be added as an ID so the gaming device 108 or mobile communication device 144 would know what tags the player 112 possesses. The tags 156 could be used as a wild card or to invoke a bonus game to activate special functionality or features for a game. Many different tags 156 could be collected ("collect them all") and let players play against each other—avatar of player A fights avatar of player B. It may also be possible to enable players 112 to interact with bonus using a specific card and swiping. Each tag 156 would give a specific functionality at the gaming device 108 or mobile communication device 144. As still another example, a player 112 may purchase multiple tags 156 and 1 or more activated tags 156 may give the player 112 a prize when swiped. This could be a separate game like a card game with multiple different characters fighting based on which tags 156 have been activated during the game.

The tags 156 may also be used to enable game customization. For example, a player 112 can design their own game—"Transfer some symbol into the game" (based on tag's 156 theme).

Again, a position of the tag 156 relative to the touch-capable user interface 256 may also enable different game play experiences as a game feature. For instance, the tag 156 being presented in a landscape orientation may result in playing a 4×5 Reel matrix whereas a presentation in the portrait orientation may result in playing a 5×4 Reel matrix.

As still another example, the tags 156 may enable loyalty features. For instance, after registration in the casino, the player 112 may get a free Welcome Bonus tag 156 (e.g. with 20. Free Spins (which can be used at any time by activating the tag 156)). The tag could be used multiple times based on rules (e.g., tag 156 can be used 5× until the tag 156 becomes invalid, tag 156 can be used once per hour/day etc. to incentivize the player 112 to keep the tag 156 and bring it back to casino next time.

The tag 156 could also be used by a player 156 to collect game-internal points and auto upgrade a game once threshold number of activations is reached.

The tag 156 can also be used to enable a reverse trading card game. A tag 156 that contains multiple items can be activated to implement certain items at appropriate times, as determined by the player.

In some embodiments, the casino could utilize the tags 156 to implement its own lottery system. In such a scenario, the casino could have its own lottery and sell tags 156 that might have a wild symbol. The wild symbol could be used in a game of any type, including a lottery game, a slot game, etc.

The tag 156 could also be used in connection with voucher promotions. It may be possible to utilize a tag 156 as a voucher within a casino magazine via a promotion campaign "Try the new game on the casino floor—redeem to get an extra award."

The tag 156 may also be distributed as part of a comeback bonus. If a player 112 loses a game, they may be provided with a tag 156 that, when later activated during a later visit, gives the player 112 an additional game incentive or feature.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method of providing game features to a user, the method comprising:
    providing a tag with an encoded physical medium that is readable by a touch-capable user interface;
    determining, at a processor, that the tag has been read by a touch-capable user interface of a gaming device in combination with detecting a gesture of the user at the touch-capable user interface of the gaming device;
    determining, at the processor, whether or not the gesture of the user indicates a desire to read data from the tag;
    in response to determining that the gesture of the user indicates the desire to read data from the tag, reading the data from the tag via the touch-capable user interface;
    enabling the gaming device to provide a predetermined game feature in response to reading the data from the tag and based, at least in part, on the gesture and an area on the tag over which the gesture is received; and
    updating, with the processor, an electronic record associated with the tag to indicate that the predetermined game feature has been enabled based, at least in part, on determining that the tag has been read by the touch-capable user interface of the gaming device in combination with detecting the gesture of the user at the touch-capable user interface of the gaming device.

2. The method of claim 1, wherein the encoded physical medium comprises a conductive ink, wherein data is encoded on the tag with the conductive ink, and wherein the method further comprises:
    determining, with the processor, the predetermined game feature based, at least in part, on the data encoded on the tag with the conductive ink.

3. The method of claim 1, further comprising:
    decrementing, with the processor, a game feature usage value in the electronic record that is used to track a permitted number of uses of the predetermined game feature.

4. The method of claim 1, further comprising:
    determining, with the processor, a context associated with the tag being read by the touch-capable user interface of the gaming device; and selecting, with the processor and based on the determined context, the predetermined game feature from among a plurality of candidate game features.

5. The method of claim 4, wherein the context is determined based on an orientation of the tag within a predetermined area of the touch-capable user interface of the gaming device.

6. The method of claim 4, wherein the context is determined based on a swiping speed of the gesture of the user.

7. The method of claim 1, wherein updating the electronic record associated with the tag comprises:
updating, with the processor, a field of the electronic record to indicate that the user has earned an opportunity to invoke the predetermined game feature at a time selected by the user;
determining, with the processor, that the user has provided an input at the gaming device indicating a desire to invoke the predetermined game feature; and
further updating, with the processor, the field of the electronic record to indicate that the user has invoked the predetermined game feature.

8. The method of claim 1, further comprising:
augmenting, with the processor, gaming graphics presented to the user via the touch-capable user interface of the gaming device based, at least in part, on a position of the tag within the touch-capable user interface.

9. The method of claim 1, wherein the tag comprises multiple encoded physical media thereon and wherein each of the multiple encoded physical media occupy different areas on the tag, the method further comprising:
determining, with the processor, the area on the tag over which the gesture of the user is provided; and
selecting, with the processor and based on the area on the tag over which the gesture of the user is provided, the predetermined game feature from among a plurality of different game features that are invokable with the tag, wherein the plurality of different game features correspond to the different areas on the tag.

10. The method of claim 1, further comprising:
determining, with the processor, a time at which the tag has been read by the touch-capable user interface of the gaming device in combination with detecting the gesture of the user at the touch-capable user interface of the gaming device;
determining, with the processor and based on the determined time, a set of predetermined game features that are eligible for activation by the user;
presenting, via the touch-capable user interface of the gaming device, the set of predetermined game features for selection by the user; and
receiving, via the touch-capable user interface of the gaming device, a user input that provides a selection of the predetermined game feature from among the set of predetermined game features.

11. A gaming system, comprising:
a processor; and
a computer-readable storage medium, coupled with the processor, comprising instructions that are executable by the processor, wherein the instructions comprise instructions that:
detect a gesture of a user at a touch-capable user interface of a gaming device;
determine whether or not the gesture of the user indicates a desire to read data encoded on a tag with a physical medium, wherein the gesture is detected substantially simultaneous with detecting the tag at the touch-capable user interface of the gaming device;
in response to determining that the gesture of the user indicates the desire to read data from the tag, cause the data to be read from the tag via the touch-capable user interface;
enable the gaming device to provide a predetermined game feature in response to reading the data from the tag, wherein the predetermined game feature is selected based, at least in part, on: (i) detecting the gesture substantially simultaneous with detecting the tag at the touch-capable user interface of the gaming device and (ii) an area on the tag over which the gesture is received; and
update an electronic record associated with the tag to indicate that the predetermined game feature has been enabled.

12. The gaming system of claim 11, wherein the instructions further comprise:
instructions that decrement a game feature usage value in the electronic record that is used to track a permitted number of uses of the predetermined game feature.

13. The gaming system of claim 11, wherein the instructions further comprise instructions that:
determine a context associated with the tag being read by the touch-capable user interface of the gaming device; and
select, based on the determined context, the predetermined game feature from among a plurality of candidate game features.

14. The gaming system of claim 11, wherein the instructions further comprise:
instructions that update an electronic record of a loyalty account associated with the user to indicate that the user has been provided the predetermined game feature in response to determining that the tag has been read by the touch-capable user interface of the gaming device in combination with detecting the gesture of the user at the touch-capable user interface of the gaming device.

15. The gaming system of claim 11, wherein the physical medium comprises a material that is readable by a capacitive-sensing touch-capable user interface, wherein the gesture of the user comprises an authentication gesture, wherein determining that the gesture of the user indicates the desire to read data from the tag comprises confirming that the authentication gesture is a valid authentication gesture, and wherein the data encoded on the tag comprises a tag identifier.

16. The gaming system of claim 11, wherein the instructions further comprise instructions that:
determine a time at which the data encoded on the tag has been read by the touch-capable user interface of the gaming device in combination with detecting the gesture of the user at the touch-capable user interface of the gaming device;
determine, based on the time, a set of predetermined game features that are eligible for activation by the user;
cause the touch-capable user interface of the gaming device to present the set of predetermined game features for selection by the user; and
receive a user input that provides a selection of the predetermined game feature from among the set of predetermined game features.

17. A server, comprising:
a communication interface that facilitates machine-to-machine communications over a communication network;
a processor coupled with the communication interface; and a computer-readable storage medium, coupled with the processor, comprising instructions that are executable by the processor, wherein the instructions comprise instructions that:
- determine whether or not a gesture of a user detected at a touch-capable user interface indicates a desire to read data encoded on a tag, wherein the gesture is detected substantially simultaneous with detecting the tag at the touch-capable user interface;
- receive data read from the tag after confirming that the gesture of the user indicates the desire to read data encoded on the tag, wherein the data is encoded on the tag with a physical medium that is readable with the touch-capable user interface;
- enable a gaming device to provide a predetermined game feature in response to determining that the tag has been read by the touch-capable user interface and based on an area of the tag over which the gesture is received; and
- update an electronic record associated with the tag to indicate that the predetermined game feature has been enabled at the gaming device.

18. The server of claim 17, wherein the instructions further comprise instructions that:
- determine a context associated with the tag being read by the touch-capable user interface; and
- select, based on the determined context, the predetermined game feature from among a plurality of candidate game features.

19. The server of claim 17, wherein the gesture of the user comprises an authentication gesture, wherein determining that the gesture of the user indicates the desire to read data from the tag comprises confirming that the authentication gesture is a valid authentication gesture, and wherein the instructions further comprise:
- instructions that update an electronic record of a loyalty account associated with the user to indicate that the user has been provided the predetermined game feature in response to determining that the tag has been read by the touch-capable user interface in combination with detecting the gesture of the user at the touch-capable user interface.

20. The server of claim 19, wherein the instructions further comprise instructions that:
- determine a time at which the data encoded on the tag has been read by the touch-capable user interface in combination with detecting the gesture of the user at the touch-capable user interface;
- determine, based on the time, a set of predetermined game features that are eligible for activation by the user;
- cause the touch-capable user interface to present the set of predetermined game features for selection by the user; and
- receive a user input that provides a selection of the predetermined game feature from among the set of predetermined game features.

\* \* \* \* \*